US011126925B2

(12) United States Patent
Nafradi et al.

(10) Patent No.: US 11,126,925 B2
(45) Date of Patent: Sep. 21, 2021

(54) QUANTUM ELECTRONIC DEVICE

(71) Applicant: The University of Sydney, Sydney (AU)

(72) Inventors: Balint Nafradi, Lausanne (CH); Mohammad Choucair, New South Wales (AU)

(73) Assignee: The University of Sydney, Sydney (AU)

( * ) Notice: Subject to any disclaimer, the term of this patent is extended or adjusted under 35 U.S.C. 154(b) by 608 days.

(21) Appl. No.: 15/781,011

(22) PCT Filed: Dec. 3, 2016

(86) PCT No.: PCT/AU2016/051196
§ 371 (c)(1),
(2) Date: Jun. 1, 2018

(87) PCT Pub. No.: WO2017/091870
PCT Pub. Date: Jun. 8, 2017

(65) Prior Publication Data
US 2020/0302328 A1 Sep. 24, 2020

(30) Foreign Application Priority Data
Dec. 3, 2015 (AU) .................................. 2015905019

(51) Int. Cl.
*G06N 10/00* (2019.01)
(52) U.S. Cl.
CPC .................................... *G06N 10/00* (2019.01)
(58) Field of Classification Search
CPC ....... G06N 10/00; G06N 99/002; B82Y 10/00
See application file for complete search history.

(56) References Cited

U.S. PATENT DOCUMENTS

2004/0247241 A1* 12/2004 Briggs .................... G11C 11/56
385/31
2005/0059020 A1* 3/2005 Vitaliano ............... G06N 10/00
435/6.11

FOREIGN PATENT DOCUMENTS

EP          1310910 A1    5/2003
JP          H-10254569 A   9/1998

OTHER PUBLICATIONS

Trauzettel et al "Spin Qubits in Graphene Quantum Dots" Nature Physics 3 (2007): 192 to 196 (Year: 2007).*
(Continued)

*Primary Examiner* — Feifei Yeung Lopez
(74) *Attorney, Agent, or Firm* — Moser Taboada

(57) ABSTRACT

This disclosure relates to quantum electronic devices for storing qubits. In particular, this disclosure relates to a quantum electronic device comprising a carbon nanosphere adapted to store a qubit represented by an electron spin and a control and readout device to set the qubit and read the qubit stored on the carbon nanosphere. Qubits stored on carbon nanospheres have a long electron spin lifetime at room temperature. This disclosure further relates to a method for quantum computing. The method comprises storing a qubit represented by an electron spin on a carbon nanosphere, performing a quantum operation on the qubit to generate a resulting qubit and reading the resulting qubit from the nanosphere. There is further provided a spintronic device comprising multiple carbon nanospheres adapted to provide a qubit represented by an electron spin in that carbon nanosphere and a control device to facilitate interaction between the qubits to perform a quantum operation.

16 Claims, 18 Drawing Sheets

(56) References Cited

OTHER PUBLICATIONS

Harneit et al., "N@$C_{60}$ for Quantum Computing", http://dx.doi.org/10.1063/1.1342501, Hahn-Meitner-Institut, Glienicker Str. 100, D-14109 Berlin, Germany, 2000.

Wolfgang Harneit, "Fullerene-based electron-spin quantum computer", https://www.researchgate.net/publication/257978907, Physical Review A, vol. 65, DOI: 10.1103/PhysRevA.65.032322, Feb. 27, 2002.

Jiang et al., "Enhanced room temperature hydrogen storage capacity of hollow nitrogen-containing spheres", Journal homepage: www.elsevier.com/locate/he, State Key Laboratory of High Performance Ceramics and Superfine Microstructures, Shanghai Institute of Ceramics, Graduate School, 1295 Dingxi Road, Chinese Academy of Sciences, Shanghai 200050, P.R. China, Nov. 5, 2009.

Nieto-Marquez et al., "Carbon nanospheres: synthesis, physicochemical properties and applications", Journal of Materials Chemistry, www.rsc.org/materials, DOI: 10.1039/c0jm01350a, Oct. 21, 2010.

Zhao et al., "A graphene and multienzyme functionalized carbon nanosphere-based electrochemical immunosensor for microcystin-LR detection", http://dx.doi.org/10.1018/j.colsurlb.2012.10.010, Journal homepage: www.elsevier.com/locate/colsurfb, Key Laboratory of Industrial Ecology and Environmental Engineering (Ministry of Education, China), School of Environmental Science and Technology, Dalian University of Technology, Dalian 116024, China, Oct. 13, 2012.

Harneit W et al., "N@$C_{60}$ for Quantum Computing", AIP Conference Proceedings, American Institute of Physics, New York, US, Mar. 4, 2000, pp. 207-210.

Simon C Benjamin et al., "Towards a fullerene-based quantum computer", Journal of Physics: Condensed Matter, vol. 18, No. 21, May 12, 2006, pp. S867-S883.

Harneit W, "Fullerene-based electron-spin quantum computer", Physical Review A (Atomic, Molecular, and Optical Physics), American Physical Society, USA, vol. 65, No. 3, Feb. 27, 2002, pp. 32322/1-032322/6.

Kane B E, "Silicon-based quantum computation", Fortschritte Der Physik, Wiley-VCH, Berlin, vol. 48, No. 9-11, Oct. 25, 2000, pp. 1023-1041.

Antonio Nieto-Marquez et al., "Carbon nanospheres: synthesis, physicochemical properties and applications", Journal of Materials Chemistry, vol. 21, No. 6, Oct. 21, 2010, pp. 1664-1672.

Supplementary European Search Report and written opinion dated Sep. 27, 2019 for Application No. 16869422.2.

Nafradi, B., et al., "Spin lifetime of itinerant electrons in chemically synthesized graphene multi-layers", Carbon, 2014, vol. 74, pp. 346-351.

Nafradi, B., et al., "Electron spin lifetime in chemically synthesized graphene sheets", physica status solidi (b), 2014, vol. 251, pp. 2521-2524.

Harnett, W., "Fullerene-based electron-spin quantum computer", Physical Review A, 2002, vol. 65, Iss 3, 032322.

International Search Report dated Jan. 20, 2017 for PCT Application No. PCT/AU2016/051196.

Balint Nafradi et al., Room temperature manipulation of long lifetime spins in metallic-like carbon nanospheres, Nature Communications, vol. 7, No. 1, Jul. 18, 2016, XP055626005.

\* cited by examiner

QUANTUM ELECTRONIC DEVICE

CROSS-REFERENCE TO RELATED APPLICATIONS

The present application claims priority from Australian Provisional Patent Application No 2015905019 filed on 3 Dec. 2015, the content of which is incorporated herein by reference.

TECHNICAL FIELD

This disclosure relates to quantum electronic devices for storing qubits.

BACKGROUND

Current computer systems comprise signal lines to carry information and memory capacitors to store information. A voltage source charges and discharges the signal lines and memory capacitors in order to represent information. For example, a voltage of +5V on a signal line or memory capacitor represents a logical '1' and a voltage of 0V represents a logical '0'. Changing a bit between '0' and '1' involves the transport of electronic charge in the form of a large number of electrons.

A more powerful way to represent information is to use the spin of a single electron. The electron spin represents a two-state quantum mechanical system, which is the basic building block of a quantum computer.

However, the problem with using electron spin is that its lifetime ($\tau s$) is too short for practical applications at room-temperature. One solution to achieve a longer lifetime is to cool the quantum mechanical system to below 4K. This leads to $\tau s$ exceeding 100 ns. Such a long lifetime allows the manipulation of electron spin together with the motion of charge to perform multiple operations. Of course, such a cooling requirement is impractical for commercially distributed products since these products would be too large, heavy, expensive and consume too much energy for home, office and mobile applications.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A quantum electronic device comprises a carbon nanosphere adapted to store a qubit represented by an electron spin; and a control and readout device to set the qubit and read the qubit stored on the carbon nanosphere. It is an advantage that qubits stored on carbon nanospheres have a long electron spin lifetime at room temperature.

The carbon nanosphere may have a diameter of between 10 nm and 150 nm or may have a diameter of 35 nm.

The carbon nanosphere may be at a temperature between −40 degrees Celsius and +40 degrees Celsius or may be at room temperature.

A method for quantum computing, the method comprises storing a qubit represented by an electron spin on a carbon nanosphere; performing a quantum operation on the qubit to generate a resulting qubit; and reading the resulting qubit from the nanosphere.

A spintronic device comprises: multiple carbon nanospheres each of which being adapted to provide a qubit represented by an electron spin in that carbon nanosphere; and a control device to facilitate interaction between the qubits on the multiple carbon nanospheres to perform a quantum operation.

The spintronic device may further comprise a conductor coupled to the carbon nanospheres to provide transport of electrons that carry the electron spin. The conductor may comprise a graphene structure.

The spintronic device may further comprise an electrode associated with each of the multiple carbon nanospheres.

The spintronic device may further comprise an isolation layer to isolate the electrodes from the multiple carbon nanospheres. The isolation layer may have a thickness between 200 nm to 400 nm and may comprise an SiO2 layer.

A distance between the multiple carbon nanospheres may be such that the spin is not lost during transport between the multiple carbon nanospheres. The distance between the multiple carbon nanospheres may be between 50 nm and 1,000 nm.

A carbon nanosphere may be used for the fabrication of a quantum electronic device.

BRIEF DESCRIPTION OF DRAWINGS

An example will now be described with reference to.

DESCRIPTION OF EMBODIMENTS

Figure 1:
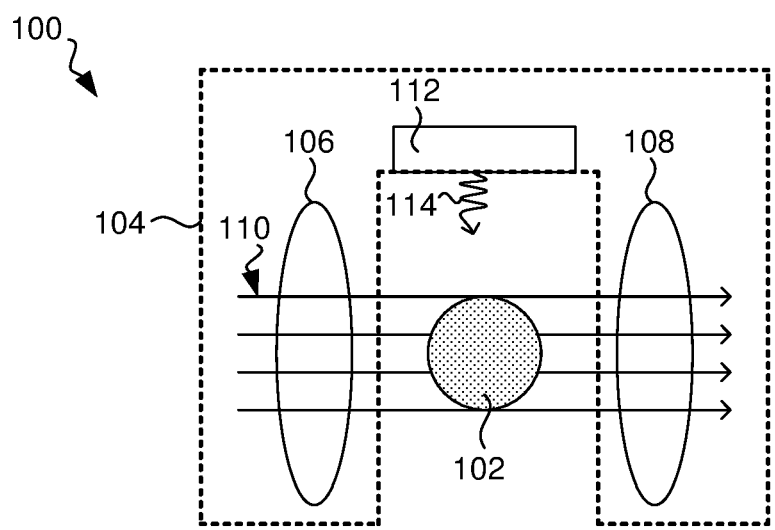
FIG. 1 illustrates a quantum electronic device.

FIG. 1 illustrates a quantum electronic device 100 that works at room temperature ($T_R$). The quantum electronic device 100 works at room temperature because it uses a carbon nanosphere 102 to store a qubit. Device 100 is referred to as 'quantum electronic' because a quantum state is represented by one or more electrons in the device. Quantum electronic device 100 further comprises a control and readout device 104. The carbon nanosphere 102 is adapted to store a qubit represented by an electron spin. Control and readout device 104 comprises a first coil 106 and a second coil 108, which together generate a magnetic field 112. Control and readout device 104 further comprises an antenna 112 to generate electromagnetic radiation 114 directed at the nanosphere 102.

The electromagnetic radiation 114 changes the electron spin if the frequency of the electromagnetic radiation 114 is equal to the resonance frequency of the electrons in the carbon nanosphere 102. The resonance frequency of the electrons, in turn, depends on the strength of the magnetic field 110 according to the principles of electron spin resonance. Since the electron spin represents a qubit, changing the electron spin results in storing a qubit on the nanosphere 102. It is noted that "stored on" refers to any mechanism by which the nanosphere 102 is used as a physical medium representing the qubit and is not to be understood to be limited to storing on the surface or storing on top of the nanosphere.

Figure 2A:
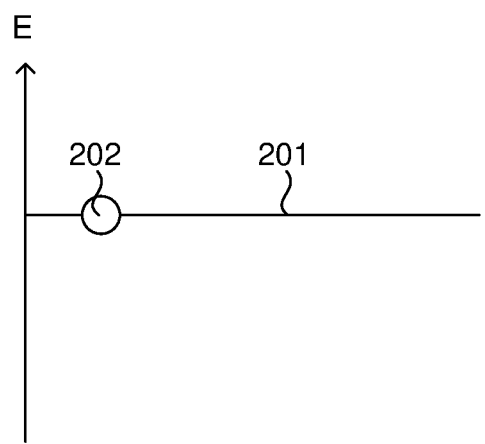
FIGS. 2a and 2b show the setting and reading in more detail.
Figure 2B:
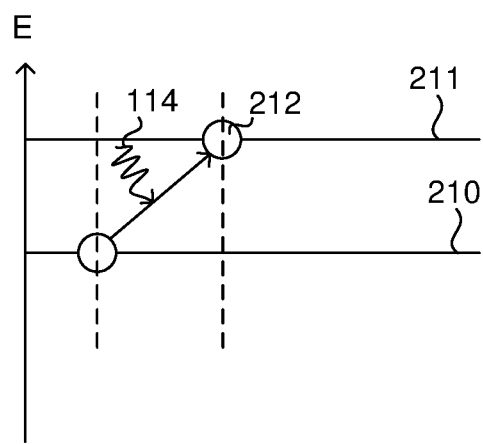

FIGS. 2a and 2b show the step of storing a qubit represented by an electron spin and reading the qubit in more detail. Generally, a qubit is a two-state quantum-mechanical system. Any two-level system can be used but in the present case, the physical support of the qubit is an electron and the information support is the spin of the electron. The two states, which are generally labelled |0> and |1>, are 'Up' and 'Down' in the case of electron spin. Without an external magnetic field, two electrons in the same orbital but with opposite spin have the same energy. An external magnetic field, however, splits the energy levels due to the Zeeman effect.

FIG. 2a illustrates a single energy level 201 of an electron 202 without magnetic field applied. FIG. 2b illustrates energy levels when magnetic field 110 is applied. More particularly, magnetic field 110 splits the energy level of the electron 202 in the nanosphere into a lower energy level 210 and a higher energy level 211. An 'Down' spin electron would be in the lower energy level 210 while an 'Up' spin electron would be in the higher energy level 211.

An electron resonates at a frequency that corresponds to the energy difference between the lower energy level 210 and the higher energy level 211. As a result, radiation, such as a microwave signal 114, that is at the resonance frequency can change the qubit that is stored on the carbon nanosphere. In other words, microwave signal 114 elevates electrons 212 into the higher energy level 211 to set the spin to 'Up' and the carbon nanosphere stores this qubit.

The strength of magnetic field 110 and the frequency of radiation 114 can have wide range of values. A stronger magnetic field 110 means a higher frequency microwave signal 114 while a weaker magnetic field 110 means a lower frequency microwave signal 114. In one example, the frequency of the microwave signal 114 is 9.4 GHz and the strength of magnetic field 110 is 0.335 T. In other examples, the frequency may be in the optical spectrum such that the antenna 112 is a laser source.

To read the spin stored on carbon nanosphere 102, antenna 112 emits a second microwave pulse. If the carbon nanosphere 102 stores a down spin, electrons are in lower energy level 210. As a result, the electrons absorb the second pulse. However, if the carbon nanosphere stores an up spin, electrons are in higher energy level 211. As a result, the electrons do not absorb the second pulse. Control and readout device 104 can measure the absorption of the second pulse. This way, control and readout device 104 can determine whether carbon nanosphere 102 stores an up spin or a down spin, which means the control and readout device 104 reads the qubit stored on the carbon nanosphere.

Spintronic Device

Figure 3A:
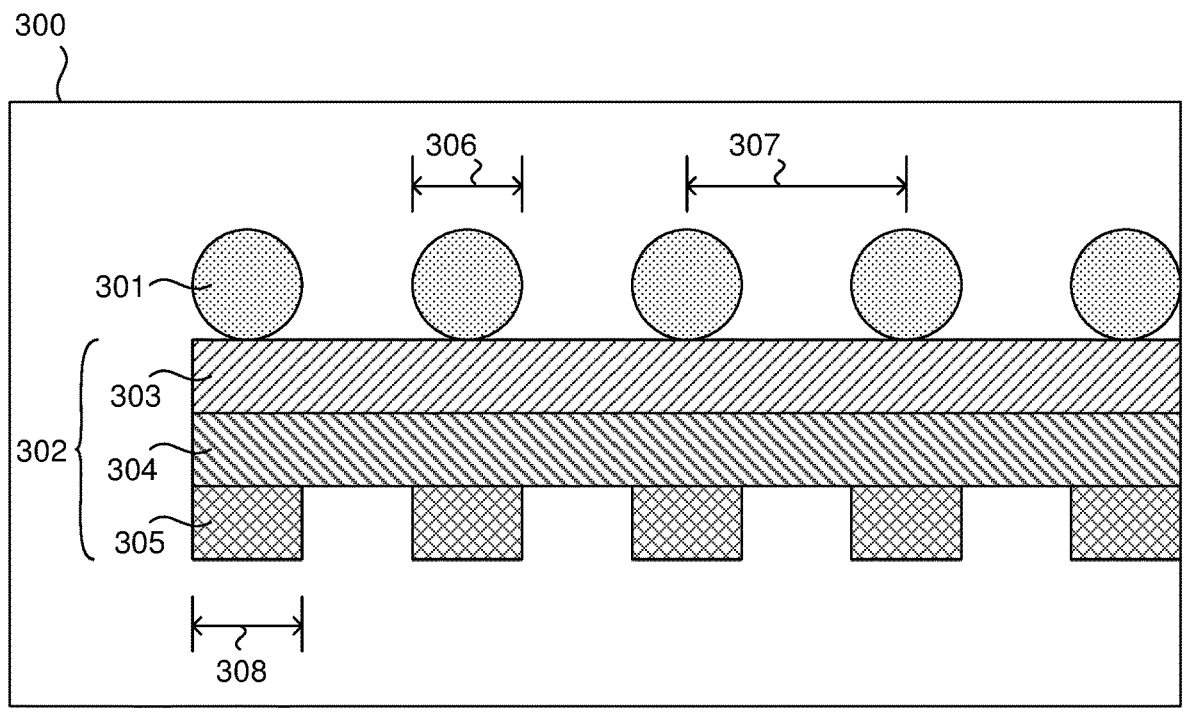
FIG. 3a illustrates a spintronic device.

FIG. 3a illustrates a spintronic device 300 that combines multiple carbon nanospheres to allow quantum operations on qubits. Spintronic device 300 comprises multiple carbon nanospheres 301 and a control device 302. As described above, each of the carbon nanospheres 301 is adapted to provide a qubit represented by an electron spin in that carbon nanosphere. The control device 302 facilitates interaction between the qubits on the multiple carbon nanospheres 301 to perform a quantum operation.

The qubits can interact over a conductor 303. The conductor 303 is coupled to the carbon nanospheres to provide transport of electrons that carry the electron spin to store the qubit. In one example, the conductor 303 is a layer of graphene and may have a thickness of a single carbon atom. However, conductor 303 may equally comprise a metal layer, such as aluminium or copper or a doped semiconductor layer. An insulator 304 provides insulation between the conductor 303 and gated electrodes 305. The insulator 304 may be a layer of silicon oxide $SiO_2$. As can be seed in FIG. 3 by the vertical alignment, each electrode 305 is associated with one nanosphere 301. The electrodes 305 may be regions of metal including copper and aluminium, doped silicon or other conductors. The thickness of the insulator 304 is such that the voltage drop across the insulator is sufficient to transport electrons from the nanospheres 301 into the conductor 303 to allow the interaction between qubits stored on nanospheres 301. This could be a 200-400 nm (typically 300 nm) thick $SiO_2$ layer.

The nanosphere diameter 306 may be between 35 nm and 40 nm. It is noted that the diameter of the nanospheres is not a critical parameter and the given range is the result of creating the nanospheres at room temperature and ambient pressure as described below. Carbon nanospheres produced under different conditions may have a different diameter but may be equally useful for storing qubits.

A larger sphere generally results in longer spin lifetime and the diameter may be 50, 100, 150 nm or any diameter between.

The distance 307 between nanospheres may be between 50 nm and 1 μm. The maximum distance is defined by the spin lifetime and the conduction of electrons, such that the spin is not lost during transport over conductor 303. The gates 305 may be square and their size 308 may be equal to the nanosphere diameter, that is, between 35 nm and 40 nm.

Spintronic device 300 combines two or more electron spin systems, that is, two or more graphene and metallic carbon nanospheres. The long spin lifetime electrons (qubits) quantum confined to 35 nanometre metallic carbon nanospheres may be encoded to a specific spin orientation (up or down) by pulsed Electron Spin Resonance (ESR) as described above with reference to FIG. 2b. Differential encoding of qubits may be achieved by applying a unidirectional magnetic field gradient across a qubit array supported on graphene (the simplest being two qubits) resulting in a unique ESR frequency for each qubit. The qubit spin information transfer may be mediated by electronic coupling of the qubit to the graphene and electronically controlled by gating the graphene support.

The qubit stored on carbon nanosphere 301 can be read by observing a current through conductor 303. More particularly, the energy difference between level 210 and 211 can be transferred by non-radiative energy transfer process which changes the resistivity of the conductor 303. Alternatively, ESR can be used to detect the qubit by repeating the process described above. More particularly if an electron spin is already in the higher 211 state a $2^{nd}$ pulse will not be absorbed, which can be measured by the readout device.

The conducting carbon nanospheres are such that quantum size effects and the low spin-orbit coupling (SOC)

allows long $\tau_S$ at $T_R$. Also, the morphology is compact to provide protection from the chemical environment to the inner spins. In particular, normal air comprises oxygen (a paramagnetic molecule) that can destroy the electron spin if the oxygen interacts with the quantum mechanical system. For example, an electron spin on a graphene sheet may have a short lifetime due to the direct contact with air. The graphene fragments on the outside of the nanospheres protect the inner-layers from interaction with oxygen. In some examples, spintronic device 300 may be encapsulated in a resin or under an inert, non-paramagnetic, atmosphere to further reduce outside influence.

Figure 3B:
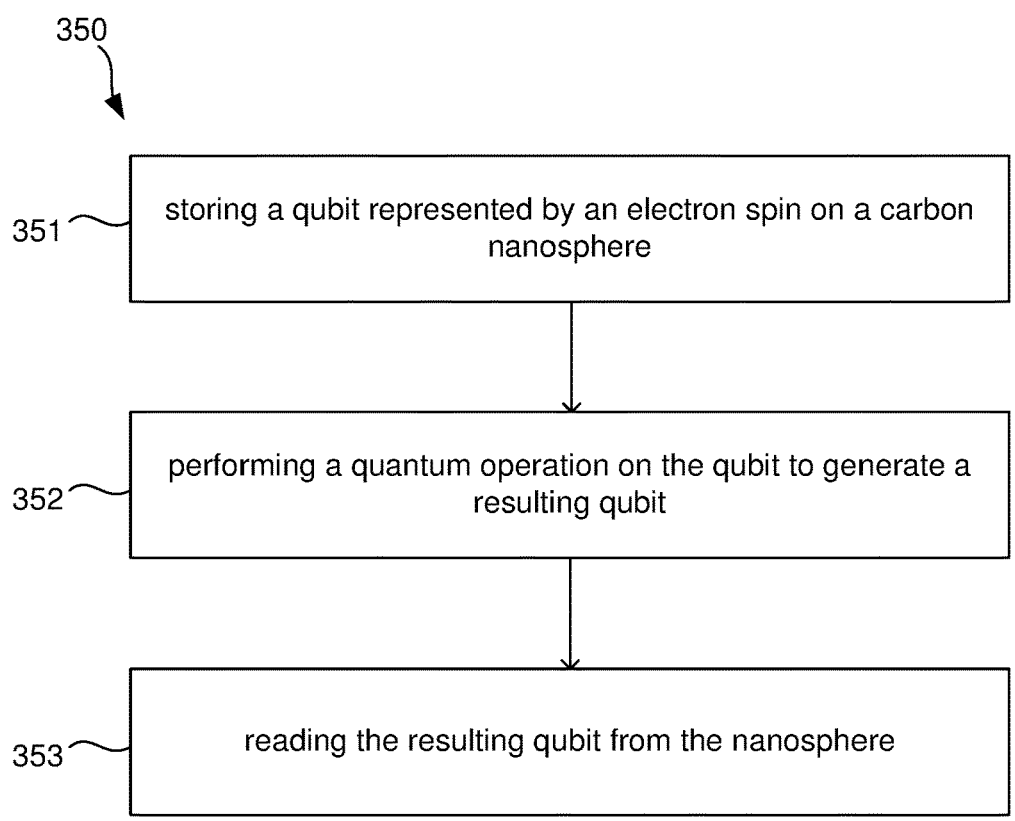
FIG. 3b illustrates a method for quantum computing.

FIG. 3b illustrates a method 350 for quantum computing. The method commences by storing 351 a qubit represented by an electron spin on a carbon nanosphere. This storing step 351 may comprise generating a magnetic field and directing electromagnetic radiation at the carbon nanosphere to change the electron spin. The next step is performing 352 a quantum operation on the qubit to generate a resulting qubit. In the example of FIG. 3a, performing the quantum operation comprises electrically activating the gated electrodes 305 to allow interaction between the carbon nanospheres 301. The spin stored on the nanospheres 301 after the interaction depends on the spin stored on the nanospheres 301 before the interaction which means a quantum operation is performed. The final step is then reading 353 the resulting qubit from the nanosphere. Reading the qubit may involve detecting a current in a single electron transistor that depends on the electron spin on the nanospheres 301. In one example, reading the qubit comprises reading the qubit from each nanosphere 301 separately, such that the result comprises multiple qubit values.

Synthesis of Carbon Nanospheres

The synthesis of carbon nanospheres may involve a flash pyrolysis of a polyaromatic hydrocarbon vapor, such as naphthalene or others, onto a glass or ceramic substrate. This may involve continuous ignition of the vapor resulting from heating 0.5 g of naphthalene (M&B Chemicals) to its flashpoint (ca. 79-87° C.) in air, using an open flame. The carbon material may be collected on a glass or ceramic dish, and any remaining naphthalene may be removed by heating the sample in a vacuum oven at 200° C. for 24 h. The synthesis may yield 0.4 g of carbon onions per hour (20% carbon recovery). The sample may be heated up to 873 K under dynamic vacuum for 72 h.

Other methods include irradiation of carbon soot under high-powered focused electron beams, thermal annealing of carbon nano-diamonds, chemical vapor deposition and arc-discharge performed under water in which graphitic electrodes are used to produce 7-15 walled carbon onions containing buckminsterfullerene ($C_{60}$) cores, at 3 mg min$^{-1}$. Formed onions rise to the surface of the water and can be collected.

Fabrication of a quantum electronic device comprises fabricating a carbon nanosphere as described above and arranging the carbon nanosphere in relation to a control and read out device to allow the setting and the reading fo the qubit stored on the carbon nanosphere. For example, fabricating the quantum electronic device may comprise doping a gated electrode into a silicon substrate, creating an insulating layer on top of the gated electrode, creating a graphene layer or metal layer on top of the insulating layer and placing the carbon nanosphere on top of the graphene or metal layer in alignment with the gated electrode.

Experiments

Figure 4:
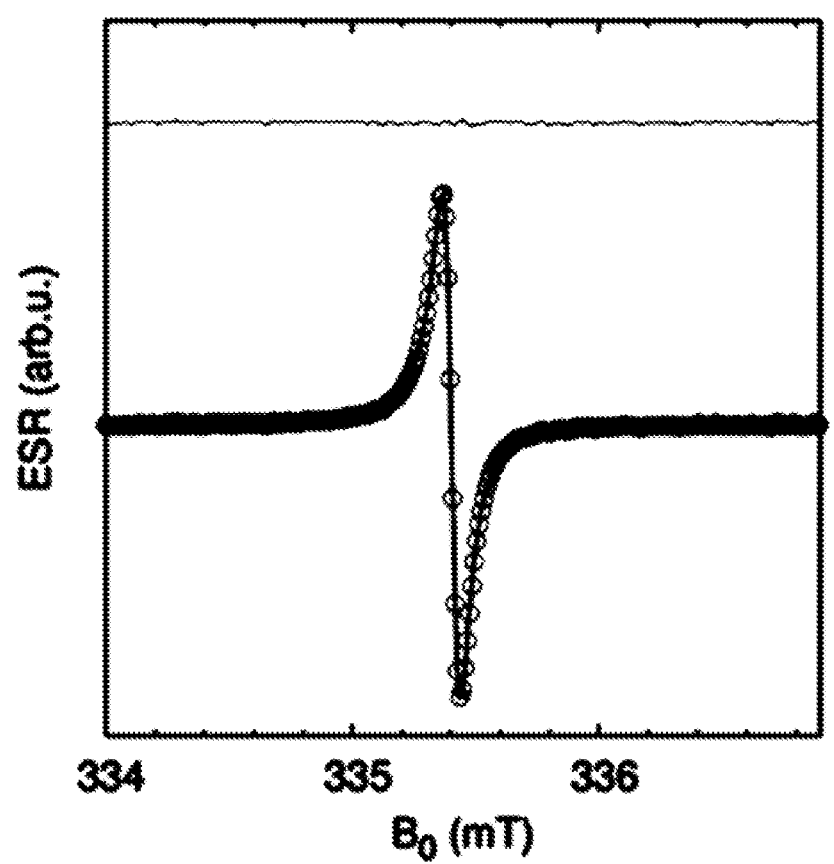
FIG. 4 illustrates a room temperature (300 K) electron spin resonance signal from the carbon nanospheres testifying the $\tau_S$ of 115 ns. A fit to a derivative Lorentzian line-shape (solid bottom line) and the near-zero residual signal (solid top line) indicating an excellent homogeneous line shape characteristic to itinerant electrons.

Approximately 100 mg was prepared for experimental procedures by burning naphthalene as mentioned above. The carbon nanospheres are stable and chemically inert. They can be processed as a powder, thin film, or dispersed in common solvents like ethanol and water. Moreover, our key observation is the long $\tau_S$=115 ns at $T_R$ of these carbon nanospheres which manifests as a single extremely narrow and symmetric electron spin resonance (ESR) signal as illustrated in FIG. 4.

Figure 8:
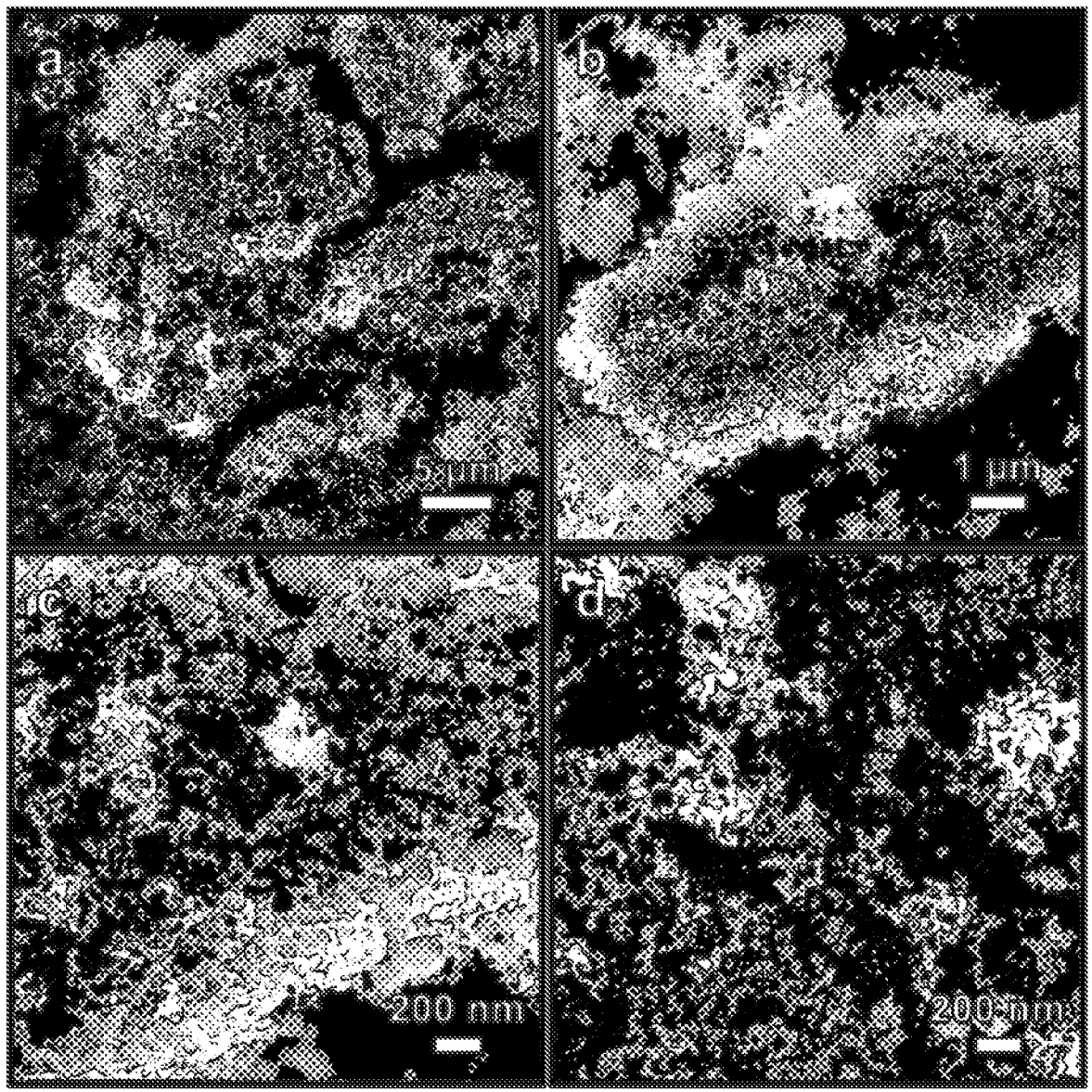
FIG. 8 illustrates SEM images of carbon nanospheres. (a) and (b) of the CNSs at low magnification, and (c) and (d) at higher magnification, with (c) being from a region in (b).
Figure 9A:
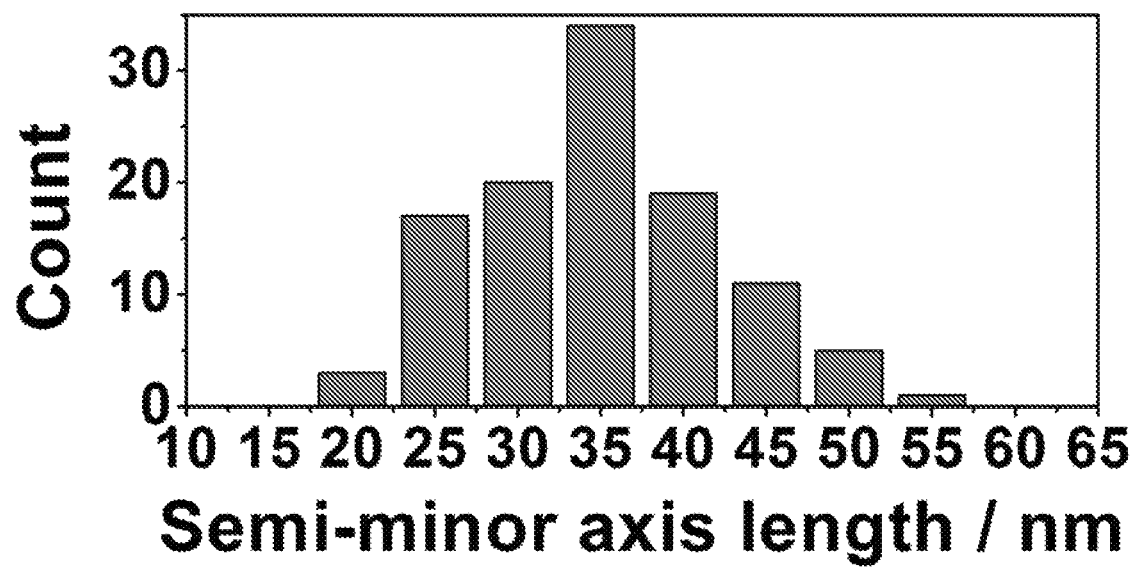
FIG. 9 illustrates a carbon nanosphere particle size distribution. (a) and (b) Narrow particle size distribution histograms (35 nm range) obtained from the TEM image in FIG. 2a assuming ellipsoidal particles with semi-major and semi-minor axis lengths plotted respectively.
Figure 9B:
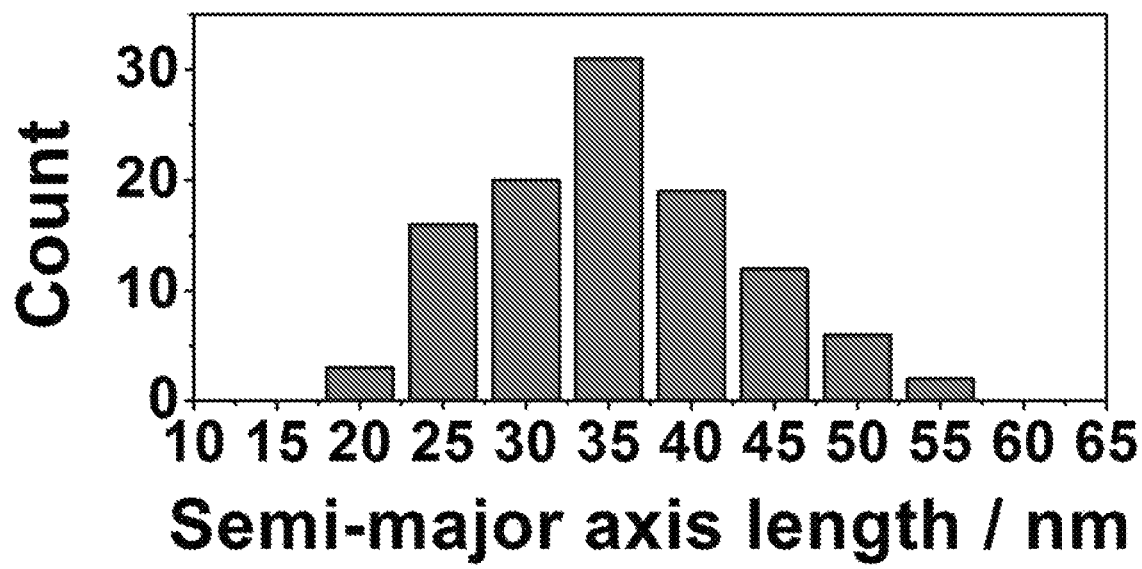
Figure 10:
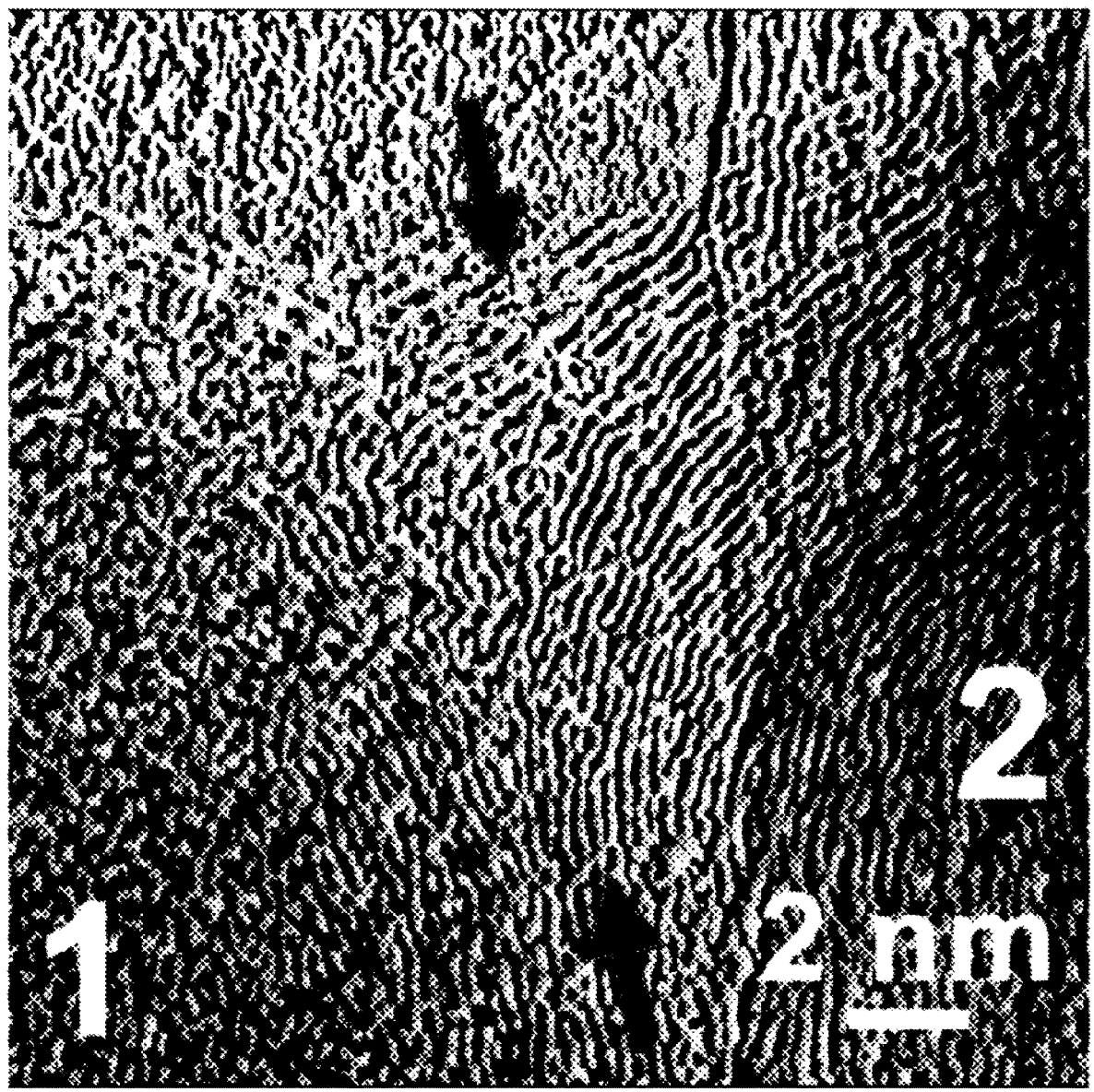
FIG. 10 illustrates a carbon nanosphere accretion. A high resolution TEM of two nanospheres (1 and 2) shown as a colour-surface topography with darker regions indicating shell overlap and the region of coalescence between them indicated by the arrows. Sphere 1 is suspended over a vacuum while 2 is on a carbon support, with ca. 15 outer layers coalescent.

The structural properties of the carbon nanospheres facilitate the observation of long $\tau_S$. Transmission electron microscopy (TEM) images show the extensive formation of spherical carbon spanning micron scales (FIG. 5a and FIG. 8). The as-prepared carbon nanospheres are conglomeration of spherical bodies and after sonication in suspension they could appear as individual particles. The nanospheres are uniform with a very narrow size distribution (35 nm particle size range) and average size of 37 nm±7 nm estimated from TEM images (FIG. 9). By means of TEM tomography a number of carbon nanospheres are also observed to have an asymmetric shape, which also results from the formation of joint graphitic layers of contacting particles (FIGS. 5f-5h), with the accretion of layers between nanospheres generally forming within a region of ca. 5 nm of the outer layers (FIG. 10).

High resolution TEM revealed the short graphitic fragments that comprise the carbon nanospheres are unclosed shells that follow the curvature of a sphere, creating many open edges is shown in FIG. 5b and FIGS. 5f-5h. The fragments also exhibit an intricate array of interplanar bonding all the way to the centre of the nanosphere. The nanospheres are not hollow; rather they show a continuation of the closed cage structure towards the centre.

Figure 11B:
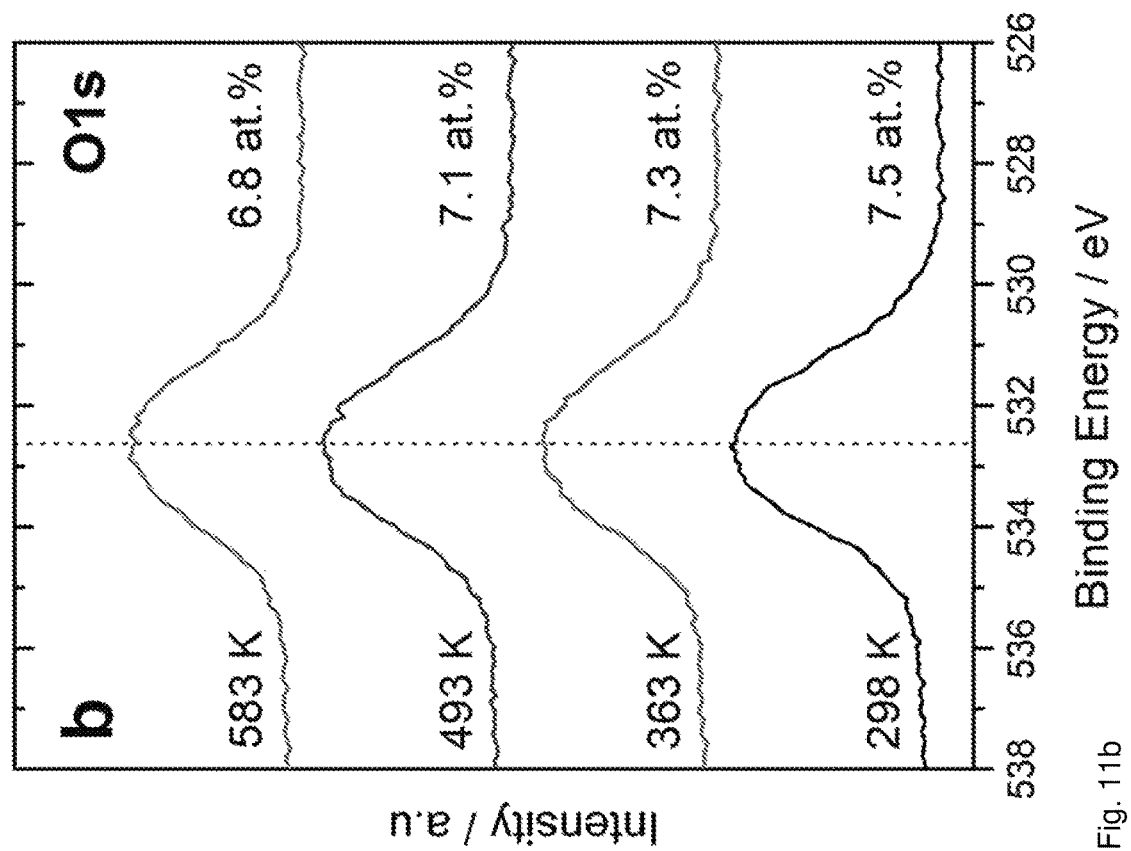
FIGS. 11a and 11b illustrate XPS spectra with corresponding atomic percentage contributions of the core C 1s and O 1s lines during in-situ heating. Dashed line in (a) is at 284.5 eV and in (b) 532.6 eV.
Figure 11A:
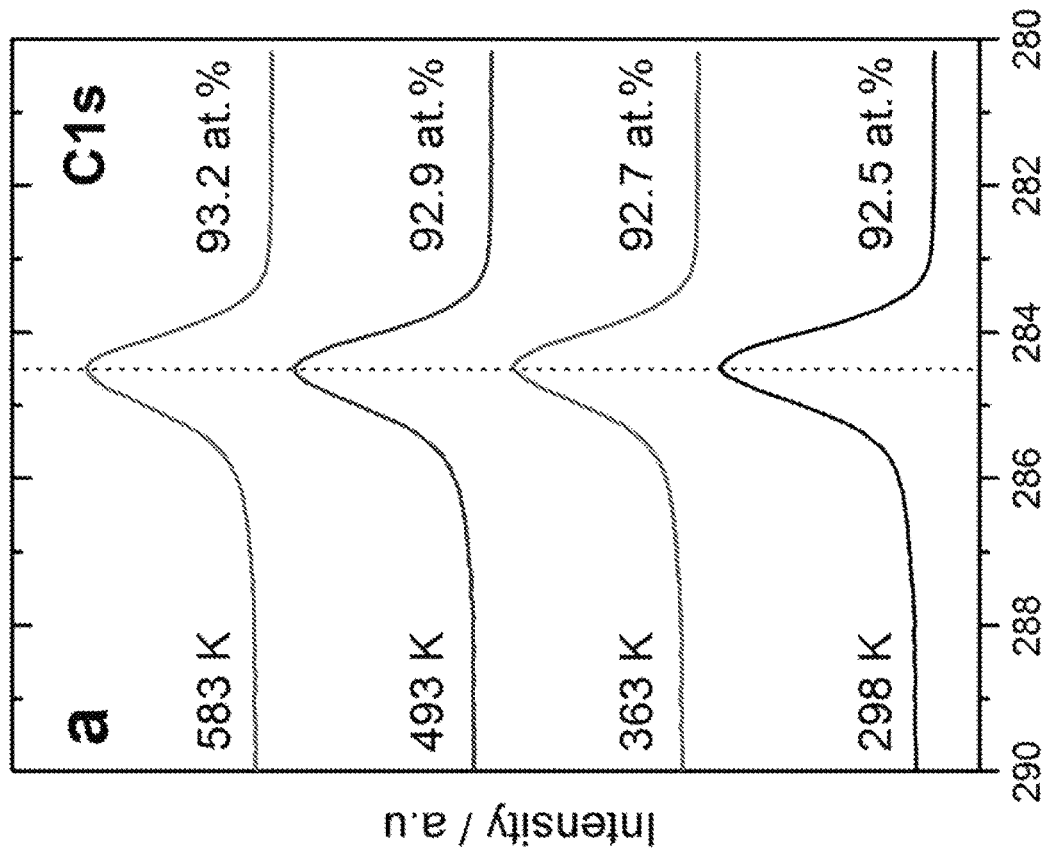
Figure 12:
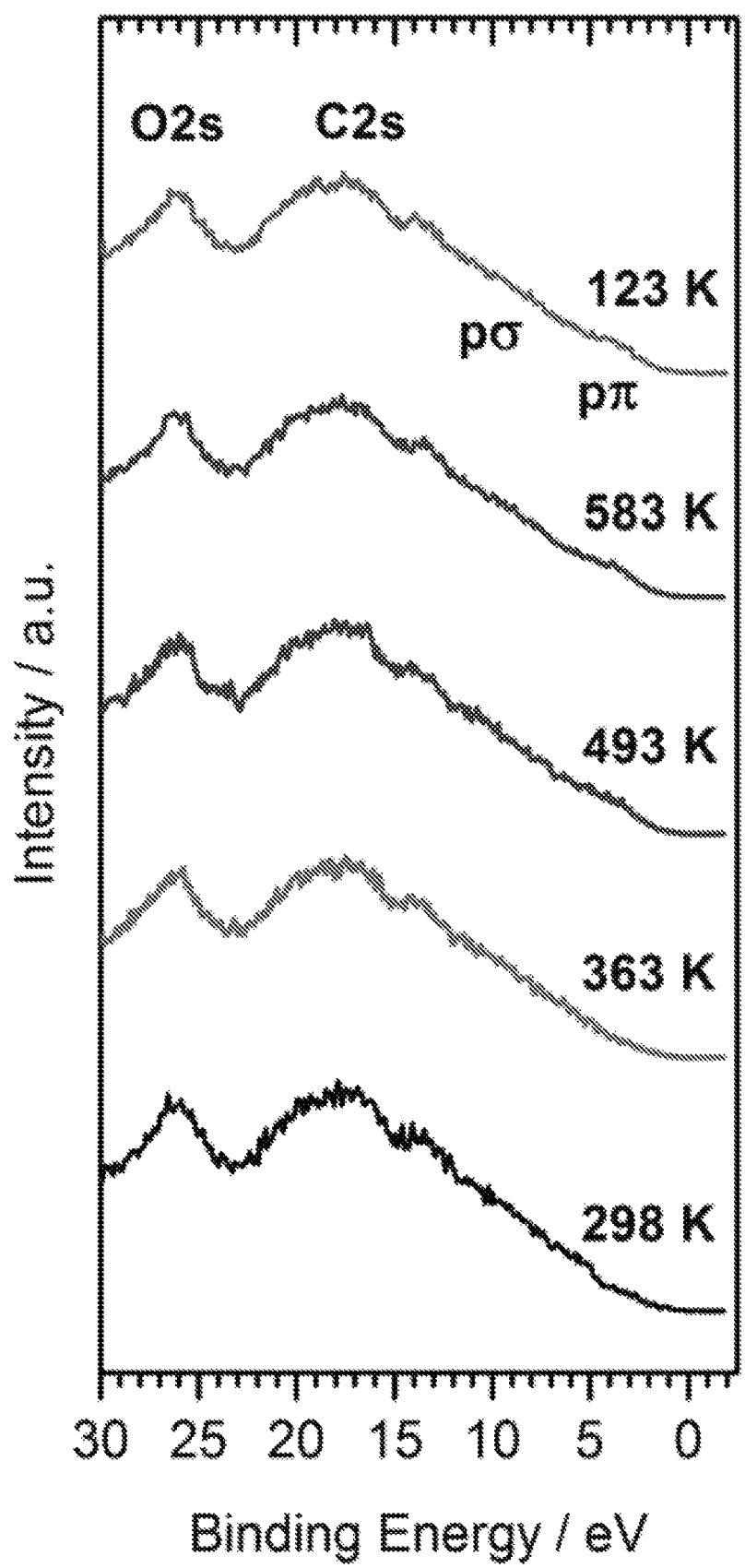
FIG. 12 illustrates In-situ valence band XPS spectra of CNSs at various temperatures. The material is first heated to 593 K then cooled to 123 K.

The structure and chemical composition of the carbon nanospheres were further characterised by X-ray photoelectron spectroscopy (XPS), thermogravimetric analysis (TGA), and Raman experiments (see FIGS. 11-16). XPS showed that the chemical structure is predominately conducting graphitic carbon (90.2 weight percent) containing surface bound oxygen (9.8 weight percent), and there was no inclusion of metals and other heavy atoms. TGA experiments confirmed the carbon nanosphere material did not contain residual precursor polyaromatic hydrocarbons. The carbon is arranged in a distorted hexagonal network and remained chemically and thermally stable even up to temperatures of 883 K. The presence of non-bonding 71 and a orbitals as a result of fragmented sheets is also revealed by valence band XPS (FIG. 12).

The surprising observation is that the carbon nanospheres possess metallic electron states localised onto them with remarkably long $\tau_S$=115 ns at $T_R$ testified by ESR spectroscopy. We propose that the non-bonding orbitals associated to the structural imperfections significantly enhance the electron density of states and induce conduction electrons to the system. This is in agreement with our observations of the changes in the $p_z$ wave functions observed in the p-σ and p-π band evolutions with temperature near the Fermi energy level as explained above (see also FIG. 12).

Figure 6:
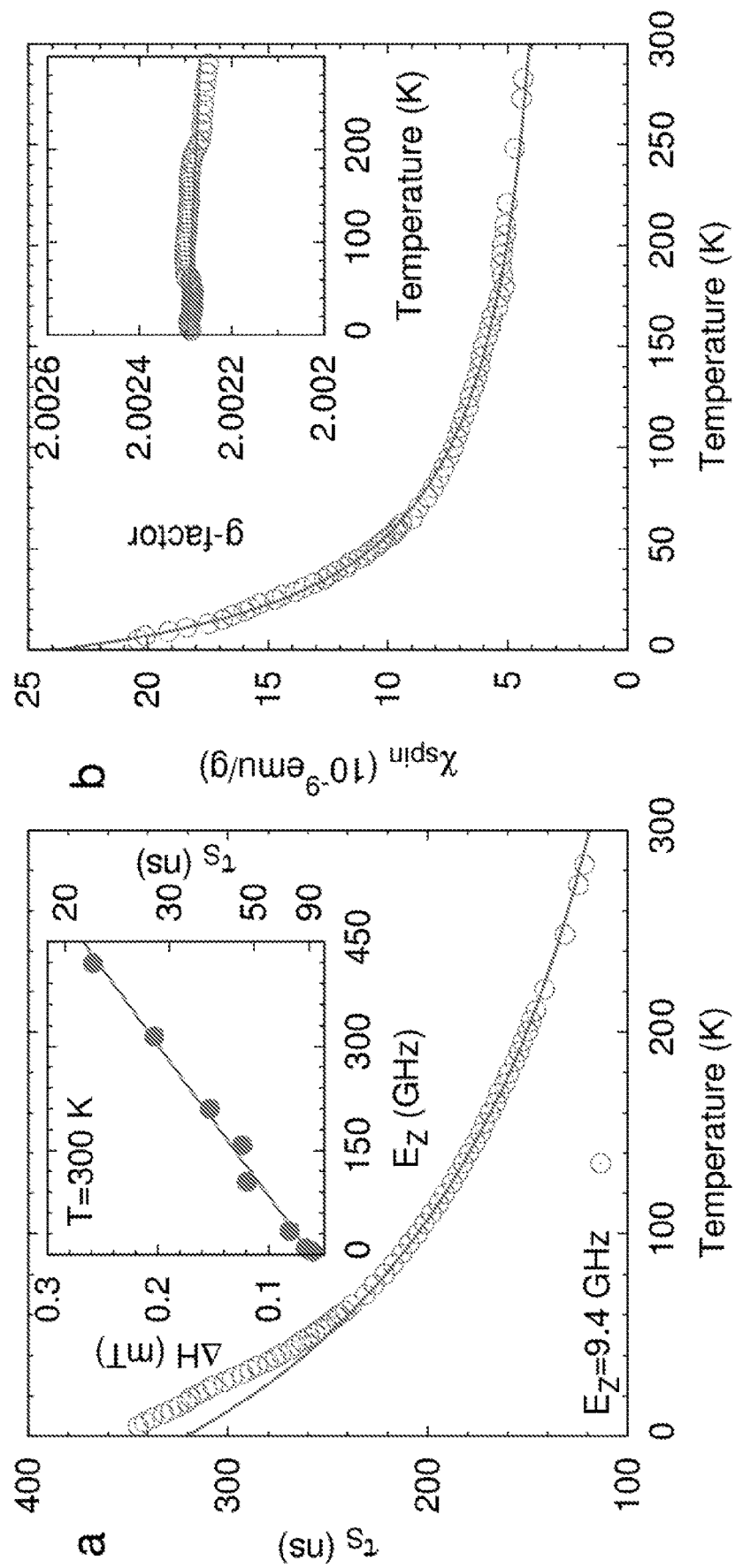
FIG. 6 illustrates the nature and number of spins as seen by variable temperature and variable frequency ESR measurements. a Temperature dependence of the spin lifetime, $\tau_S$, measured by ESR at $E_Z$=9.4 GHz. Line (red) in a shows the calculated 1/T temperature dependence of $\tau_S$ characteristic to spin-orbit interaction dominated temperature dependence. Inset in a presents multi-frequency ESR measurements at 300 K. The ESR linewidth as a function of the Zeeman energy, $E_Z$, at T=300 K. The linear fit (straight solid line) results from the equation (1), with $\tau_S$=115 ns and $\delta$=1 meV. b Temperature dependence of the spin susceptibility, $\chi_S$, measured by ESR at $E_Z$=9.4 GHz with an overlaying Curie-Weiss line, characteristic to small metallic particles. Inset in b shows the temperature independent g-factor, in good agreement with metallic behaviour.

In order to thoroughly characterise the itinerant nature and number of spins ESR was performed using a broad 4-420 GHz frequency and 2-300 K temperature range (FIG. 6). At 300 K and at 9.4 GHz frequency the g-value of the ESR line is 2.00225 (inset FIG. 3b) and the line width (half width at half height) is ΔH=0.056 mT, equivalent to $\tau_S$=115 ns (FIG. 6a). This is a remarkably long conduction-electron spin lifetime for these carbon nanospheres.

The observed spectra had, to a high precision, homogeneously broadened Lorentzian line-shapes and the deviation from the Lorentzian line-shape in the entire spectra was less than 5%, (see FIG. 4 as an example), which reveals the itinerant nature of the spins. The hyperfine ESR lines of $^{13}$C were also absent which are readily observable for localized spins but absent in conducting systems due to motional narrowing. The g-factor is characteristic to conduction electrons of carbon, and it does not originate from metallic inclusions (in agreement with our chemical analysis) or from localised paramagnetic 'dangling' bonds of carbon (commonly with g=2.00282).

The homogeneous line-shape allowed for the use of saturation techniques to determine the spin-lattice ($T_1$) and spin-spin ($T_2$) relaxation times independently by employing procedures outlined by Poole and Farach, and are detailed further below. With good approximation we found that $1/T_1=1/T_2=\tau_S=115$ ns, which simultaneously verified that the line-shape was homogenous as expected for itinerant electrons.

Figure 17:
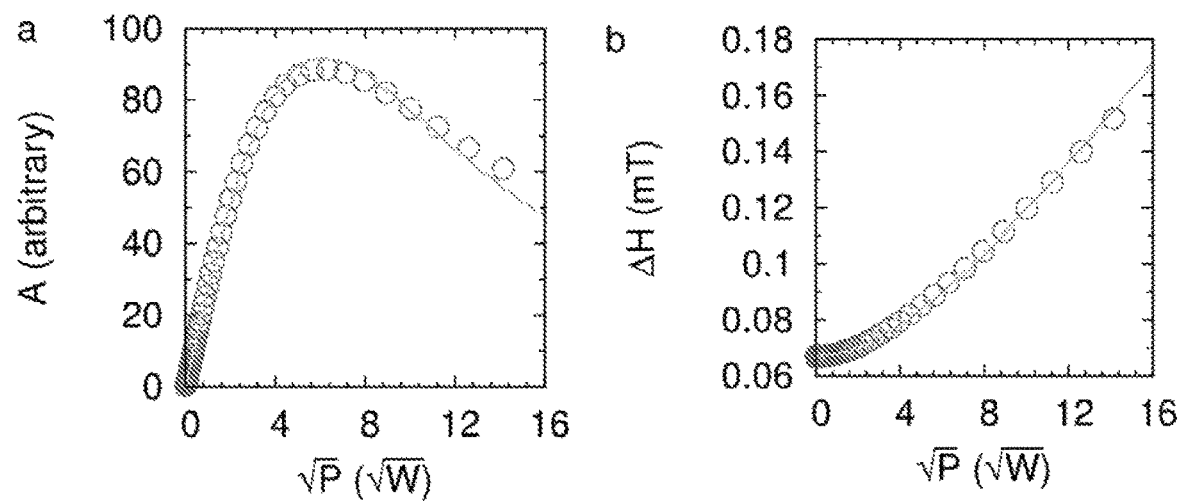
FIG. 17 illustrates room temperature saturation of CNSs at 9.4 GHz. (a) Peak-to-peak amplitude plotted as a function of the square root of the microwave power P. (b) ESR linewidth plotted as a function of the square root of the microwave power P. The lines in both figures are calculated power dependence with $1/T_1=1/T_2=\tau s=100$ ns giving excellent description simultaneously to both quantities.

Multi-frequency ESR in the 4-420 GHz range also confirmed that conduction electrons are confined within the carbon nanoparticles. The ESR linewidth as a function of magnetic field revealed a linear increase with increasing magnetic field at $T_R$ (FIG. 6a and see also FIG. 17). Note that in the case of bulk metals ΔH is solely determined by SOC thus it is independent of the magnetic field. However, the behaviour observed when the carbon nanospheres experience a variation in external magnetic field is characteristic to conduction electrons enclosed in nanoparticles where $\tau_S$ is determined by both the spin-orbit interaction and the electron confinement.

A linear frequency broadening of ΔH for itinerant electrons confined on small particles follows:

$$\Delta H = E_Z/(\delta \gamma_e \tau_S) \tag{1}$$

where $E_Z$ is the Zeeman energy, δ is the average electronic energy level spacing, and $\gamma_e$ is the electron gyromagnetic ratio. Calculations based on the obtained $\tau_S=115$ ns yielded δ=1 meV for the average electronic energy level spacing (linear line of best fit in FIG. 6). Following Kubo's calculations for a small metallic particle:

$$\delta = 4m_e v_F^2/3n\pi L^3 \tag{2}$$

where $m_e$ is the free electron mass, $v_F=10^6$ m/s is a typical Fermi velocity for graphene, and n=2.3 g/cm$^3$ is the atom density of carbon nanospheres, these values yield an effective particle size of L=40 nm. This number is in good agreement with that obtained from TEM images.

The temperature dependent properties of the ESR (FIG. 6 and see also FIG. 17) further supports that conduction electrons are confined within the carbon nanospheres. The g-factor was temperature independent (inset FIG. 6b), which is in good agreement with general observations in metals and in graphitic nanoparticles. The resulting spin susceptibility is temperature dependent, following a Curie-Weiss dependence, as one may expect for nanoparticles of metals (FIG. 6b).

Figure 18:
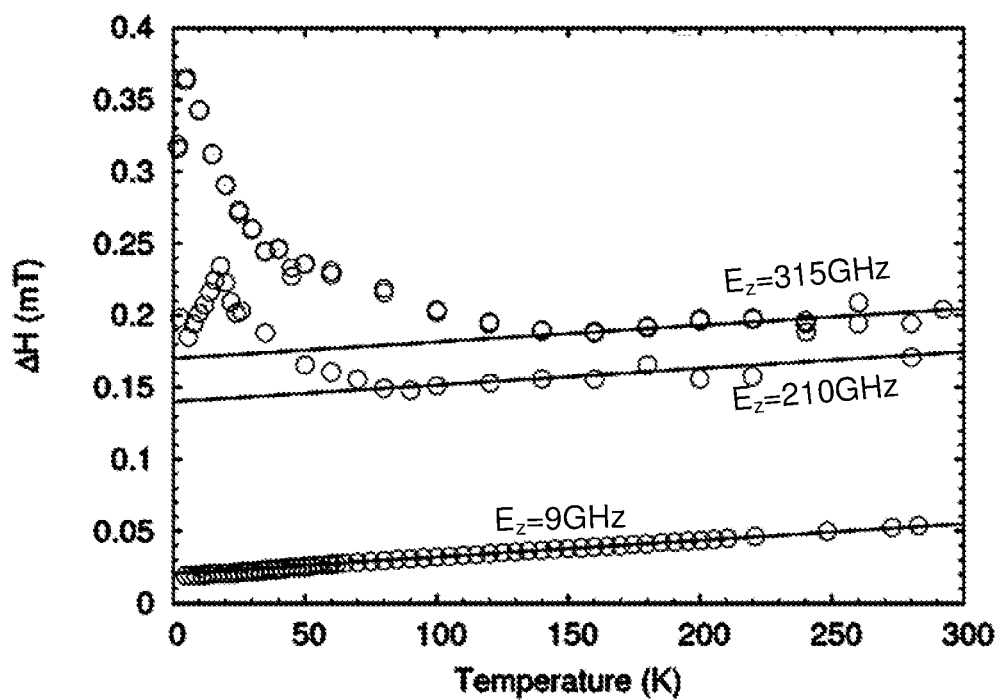
FIG. 18 illustrates temperature dependence of the ESR linewidth measured at different strength of the Zeeman energy. The red $E_Z$=9 GHz points are the same data shown in FIG. 3a of the manuscript. At high-temperatures where no saturation effect occurs the linewidth decreases linearly by decreasing temperature. This behaviour is commonly observed in metals and explained by spin-orbit coupling by Elliott. The slope is independent of $E_Z$ at high temperatures also in agreement with Elliott mechanism. The deviation from the linear dependence at high-frequencies and at low temperatures is due to ESR saturation effects which occurs progressively at higher temperatures by increasing $E_Z$.

The $\tau_S$ increases with 1/T as the temperature is decreased (FIG. 6a and see FIG. 18) which is characteristic to metals, where electron-phonon scattering due to spin-orbit interaction is responsible for the temperature induced shortening of $\tau_S$. As the temperature was decreased $\tau_S$ reached 350 ns at 4 K (FIG. 6a). Deviations from 1/T-dependence below ~50 K are indicative to phonons in disordered graphitic sheets (FIG. 6a). Calculations indicate that the observed temperature induced shortening of $\tau_S$ is caused by the scattering of conduction electrons by the potentials of peripheral atoms having edge-inherited electronic and lattice dynamical features. This finding is in agreement with our structural characterisation i.e. the carbon nanospheres are built up of flakes (FIG. 5f-5h and Table below and FIG. 16). Even though the material is highly defective, the intrinsically weak spin-orbit interaction of carbon has allowed for remarkably long $\tau_S$.

The $\tau_S$ in the carbon nanospheres is significantly enhanced over that found in other defective carbon materials, represented by a narrowed ESR linewidth, e.g. we observe 0.056 mT (115 ns) of conduction electron spins compared to the 0.3-0.4 mT (~25 ns) of localised spins in defective diamond and 0.6-1 mT ($T_2$~10 ns) of conduction electrons in amorphous carbon (at low temperature). The $\tau_S$ observed in the carbon nanospheres is a two orders of magnitude enhancement over that found in conducting crystalline graphene. We attribute part of this increase in $\tau_S$ to quantum confinement effects observed in conducting nanostructures.

Figure 7:
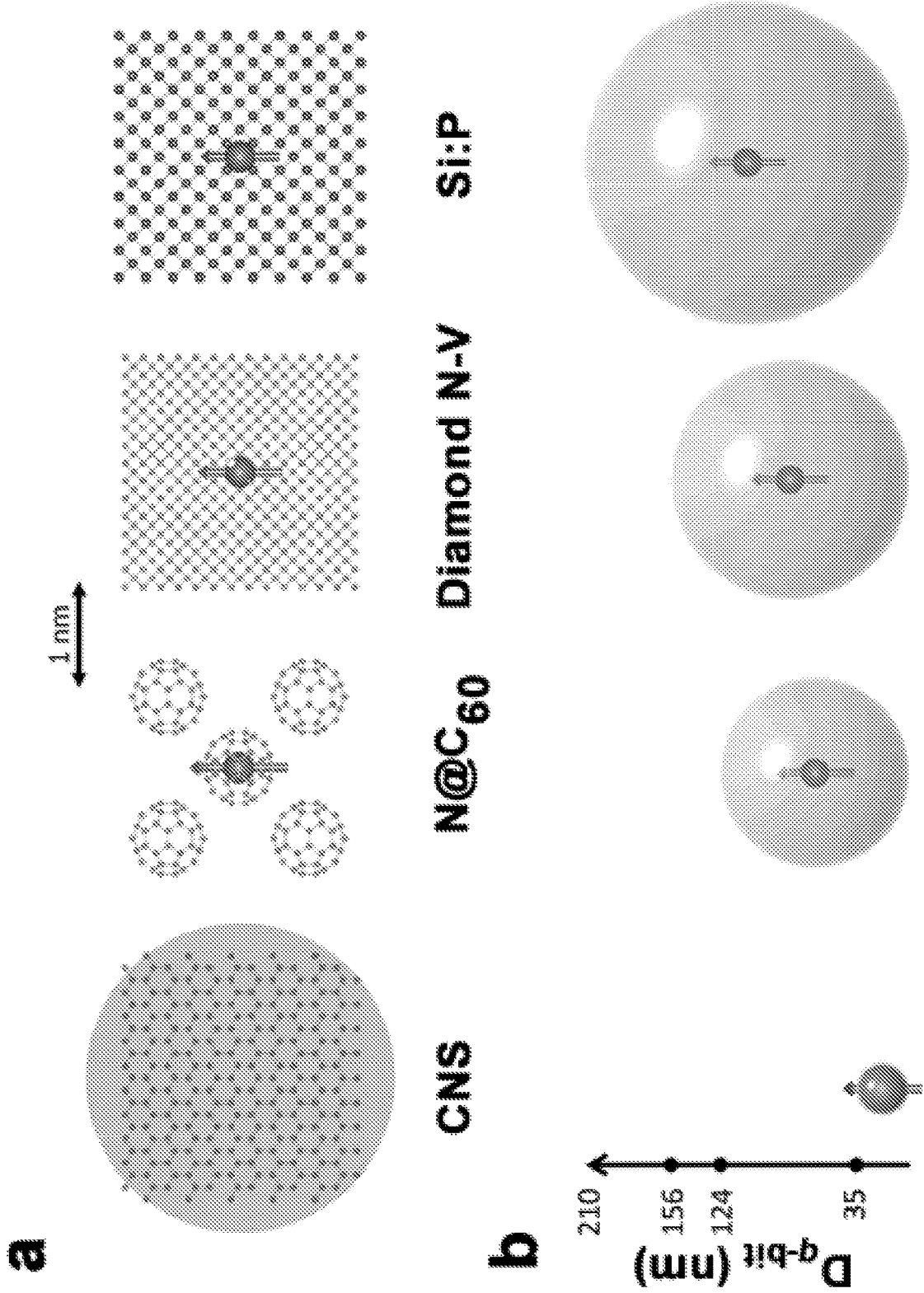
FIG. 7 illustrates a comparison of itinerant and localised electron based qubits. a 2×2 nm region from the centre of each respective system structure with the red spheres representing the localised spins, which are surrounded by spacer atoms. In the case of carbon nanospheres (CNS) the spin information is encoded by a delocalised electron spin which spreads the over the entire 35 nm diameter (shaded area) making the system more robust against external magnetic field fluctuations and hyperfine interactions enforced by nuclear spins. Consequently, high qubit density can be achieved without enhanced decoherence. b The sphere diameters comparing the required volume for different types of qubits.

Although various ESR methods can be used to probe microsecond electron spin lifetimes in chemically modified diamond and fullerenes, such long spin lifetimes are associated to highly localised electrons. A property of the carbon nanospheres is that they provide practical conduction $\tau_S$ at $T_R$ robustly. The hyperfine interaction of $^{13}$C does not cause an enhanced spin decoherence. Such spin decoherence is readily observed in insulating qubit structures with localised magnetic moments like N@C$_{60}$ and N-V centres in diamond. The motional narrowing of conduction electrons in the carbon nanospheres results in the suppression of spin decoherence due to dipole-dipole interactions of neighbouring qubits, which can allow a higher density packing of qubits to be, in principle, achieved (FIG. 7).

This disclosure demonstrates that room temperature $\tau_S$ values for a useful spintronic material can be achieved by confinement of conduction electrons to spherical nanosize carbon particles, that is, carbon nanospheres. Prolonging $\tau_S$ at room temperature is possible due to the weak spin-orbit interaction of carbon structural defects, and phonons not severely diminishing $\tau_S$ in the carbon nanospheres near room temperature. Additionally, the itinerant electron based architecture offers robustness against hyperfine interactions and weak dipole-dipole fields, fundamentally eliminating the need for isotope engineering prior to the close-packing of qubits. At low temperatures, the $\tau_S$ values observed for the carbon nanospheres compare more closely to that reported for metallic nanoparticles, than engineered semiconducting nanoparticles. This points to an opportunity to realise ultra-long $\tau_S$ in carbon-based materials for applications in future spintronic devices.

The time-window for processing electron spin information (spintronics) in solid-state quantum electronic devices is determined by the spin-lattice and spin-spin relaxation times of electrons. Minimizing the effects of spin-orbit coupling and the local magnetic contributions of neighbouring atoms on spin-lattice and spin-spin relaxation times at room temperature remain substantial challenges to practical spintronics. This disclosure reports conduction electron spin-lattice and spin-spin relaxation times of 175 ns at 300 K in 37±7 nm carbon spheres, which is remarkably long for any conducting solid-state material of comparable size. Following the observation of spin polarization by electron spin resonance, it is possible to control the quantum state of the electron spin by applying short bursts of an oscillating magnetic field and observe coherent oscillations of the spin state. These results demonstrate the feasibility of operating electron spins in conducting carbon nanospheres as quantum bits at room temperature.

Electron spin states are an attractive realization of a quantum bit (qubit) as they can undergo a transition between the spin-up and spin-down quantum states. One technique for manipulating electron spin is electron spin resonance (ESR). ESR is the physical process, whereby electron spins are polarized in an external magnetic field $B_0$ and rotated by an oscillating magnetic field $B_1$ (perpendicularly to $B_0$, of frequency f), which is resonant with the spin precession frequency in an external magnetic field $f=g\mu_B B_0/h$ ($\mu_B$ is the Bohr magneton and g the electron spin g-factor, h is the Planck's constant). ESR is result of the coherence of the precession of electrons over the spin-lattice and spin-spin relaxation times, $T_1$ and $T_2$, respectively. $T_1$ is characterized by a number of spin-lattice relaxation process that depend on the spin-orbit coupling to connect the spin of an electron with the lattice vibrational spectrum of the solid. The second important relaxation time $T_2$ is set by the probability of spin-spin relaxation. $T_2$ is concerned with the local magnetic field contribution by one magnetic atom on others and represents the phase coherence of a set of spins. The dominant relaxation time is the shorter of $T_1$ and $T_2$. In magnetically homogenous itinerant systems (for example, metals), the condition $T_1=T_2$ is often met and represents the longest period of time that in-phase precessing electron spins and magnetization can propagate as a uniform mode.

Electron spin states therefore should be robust against decoherence. The feasibility of applications involving classical or quantum information processing is hence dependent on $T_1$ and $T_2$ relaxation times. The prerequisite for $T_1$ and $T_2$ relaxation times may be ~100 ns, as this may be one example of the lower-bound for signal processing times in quantum electronic devices.

Figure 5:
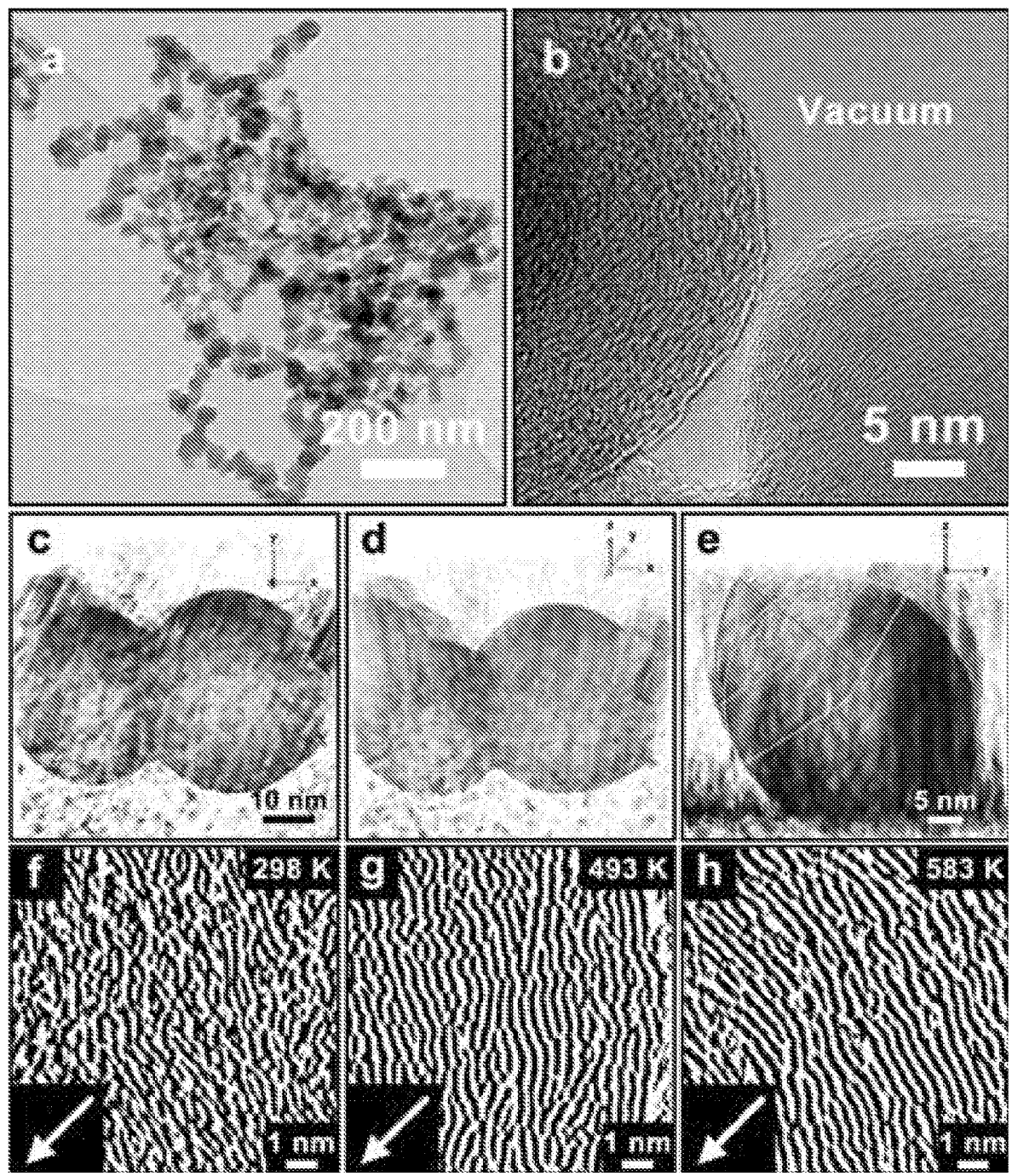
FIG. 5. illustrates carbon nanosphere structure and size. a TEM image of carbon nanospheres on a carbon support. Darker regions of relative opacity are due to particle overlap. b High resolution TEM of discrete carbon nanospheres. c-e TEM 3-dimensional tomography reconstruction of the carbon nanospheres. The particles are spherical and also distort slightly to an ellipsoidal shape, with coalescence. NB: spheres appear transparent due to the high image contrast with the sputtered gold substrate, small sphere size, and extremely thin sphere layers. Scale bars in d were omitted for clarity. f-h In-situ variable temperature high resolution TEM images of the non-crystalline carbon nanosphere structure within regions of various spheres. The spheres remain non-crystalline upon heating to 583 K. A high contrast is applied to the images to allow the graphite planes to be distinguished with a black outline. Arrows indicate direction towards the center of the sphere.

The structural and chemical properties of the carbon nanospheres influence the observation of the long $T_1=T_2$. Transmission electron microscopy (TEM) images show the extensive formation of spherical carbon spanning micron scales (FIG. 5 and FIG. 8). The as-prepared carbon nanospheres are a conglomeration of spherical bodies and after sonication in suspension they could appear as individual particles (FIG. 5b). In comparison with other nanoparticle quantum dots used as qubits, for example, Mn-doped PbS, the carbon nanospheres are relatively uniform with a size distribution of 37±7 nm estimated from TEM images (FIGS. 9a and 9b).

By means of TEM tomography, a number of carbon nanospheres are also observed to have an asymmetric shape, which also results from the formation of joint graphitic layers of contacting particles (FIG. 5c-e), with the accretion of layers between nanospheres generally forming within a region of ca. 5 nm of the outer layers (FIG. 10). High-resolution TEM revealed the short graphitic fragments that comprise the carbon nanospheres are graphitic fragments that follow the curvature of a sphere, creating many open edges (FIG. 5f-h). The individual graphitic fragments in the carbon nanospheres are not curved and do not resemble the curvature in nanotubes or fullerenes. Rather, the fragments exhibit an intricate array of interplanar bonding all the way to the centre of the nanosphere even when heated to temperatures of 583 K. The carbon nanospheres are not hollow and show a continuation of the closed cage structure towards the centre.

X-ray photoelectron spectroscopy (XPS), thermogravimetric analysis (TGA), and Raman experiments were also performed and are found in FIGS. 11-14. XPS indicated that the chemical structure is predominately conducting graphitic carbon (90.2 wt %) containing surface bound oxygen (9.8 wt %), and there was no inclusion of metals and other heavy atoms. TGA experiments confirmed the carbon nanosphere material did not contain residual precursor polyaromatic hydrocarbons and remained chemically and thermally stable even up to temperatures of 883 K. Valence band XPS revealed the presence of non-bonding grand a orbitals as a result of fragmented sheets that contained carbon arranged in a distorted hexagonal network.

Figure 19:
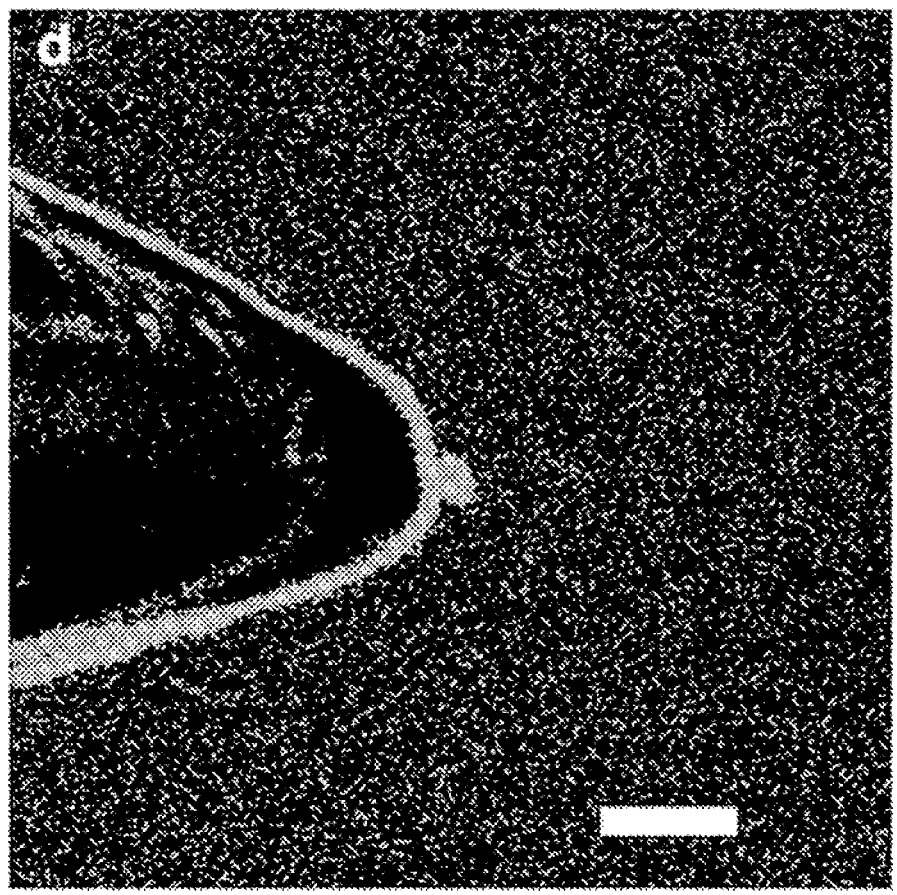
FIG. 19 is an SEM image of an individual ~50 nm carbon nanosphere physically positioned on a Si substrate using a 200-nm tungsten manipulator tip. Scale bar, 200 nm.

The carbon nanospheres can be synthesized and are readily, yielding a homogenous material that is structurally highly non-crystalline (FIG. 5). Thus the carbon nanospheres can be reliably employed for spintronics applications with minimal processing and without the need for fabricating a well-defined crystal structure to achieve long $T_1$ and $T_2$. Furthermore, in a conducting carbon nanosphere qubit system, the rich chemistry of carbon can, in future experiments, allow for a myriad of non-covalent and covalent interactions to connect the nanospheres to conducting electronic device surfaces. Finally, the carbon nanospheres are of a size that can be isolated on a surface from the 'top-down' using micromanipulator probe tips (FIG. 19), and this in future experiments can allow for building qubit ensembles.

At 300 K and at 9.4 GHz frequency the continuous-wave ESR line width (peak-to-peak) is $\Delta H=0.056$ mT (inset FIG. 20a) and the g-value is 2.00225 (inset FIG. 20b). This is a remarkably narrow conduction-electron spin ESR line testifying the long spin-relaxation times. The observed spectra had, to a high precision, homogeneously broadened Lorentzian line shapes and the deviation from the Lorentzian line shape in the entire spectra was <5%, which reveals the itinerant nature of the spins. The observed linewidth determined by continuous-wave ESR is identical within the experimental error with the $T_2$-derived Lorentzian width. Note that the size distribution of the carbon nanospheres has a negligible effect on the linewidth at 9.4 GHz because of the motional narrowing of conduction electrons. The hyperfine ESR lines of $^{13}C$ were also absent (which are readily observable for localized spins) due to motional narrowing of conduction electrons. The g-factor is characteristic to conduction electrons of carbon, and it does not originate from metallic inclusions (in agreement with our chemical analysis) or from localized paramagnetic 'dangling' bonds of carbon (commonly with g=2.00282).

In addition to the continuous-wave ESR experiment, where detection and spin rotation occur at the same time, experiments probe the spin relaxation dynamics of $T_1$ and $T_2$ independently using pulsed ESR (FIG. 20a). At 9.5 GHz frequency and 300 K, with good approximation the intrinsic $T_1=T_2=175$ ns. Pulsed ESR therefore simultaneously validated continuous-wave ESR results and verified that the line-shape obtained by continuous-wave ESR was indeed homogenous as expected for itinerant electrons.

The temperature-dependent properties of the ESR spectra (FIG. 20) support that conduction electrons are confined within the carbon nanospheres. The g-factor was temperature independent (FIG. 20d), which is in good agreement with general observations in metals with weak spin-orbit coupling and in graphitic nanoparticles. The resulting spin susceptibility is temperature dependent, following a Curie-Weiss dependence, as one may expect for nanoparticles of metals (FIG. 20b).

Figure 20:
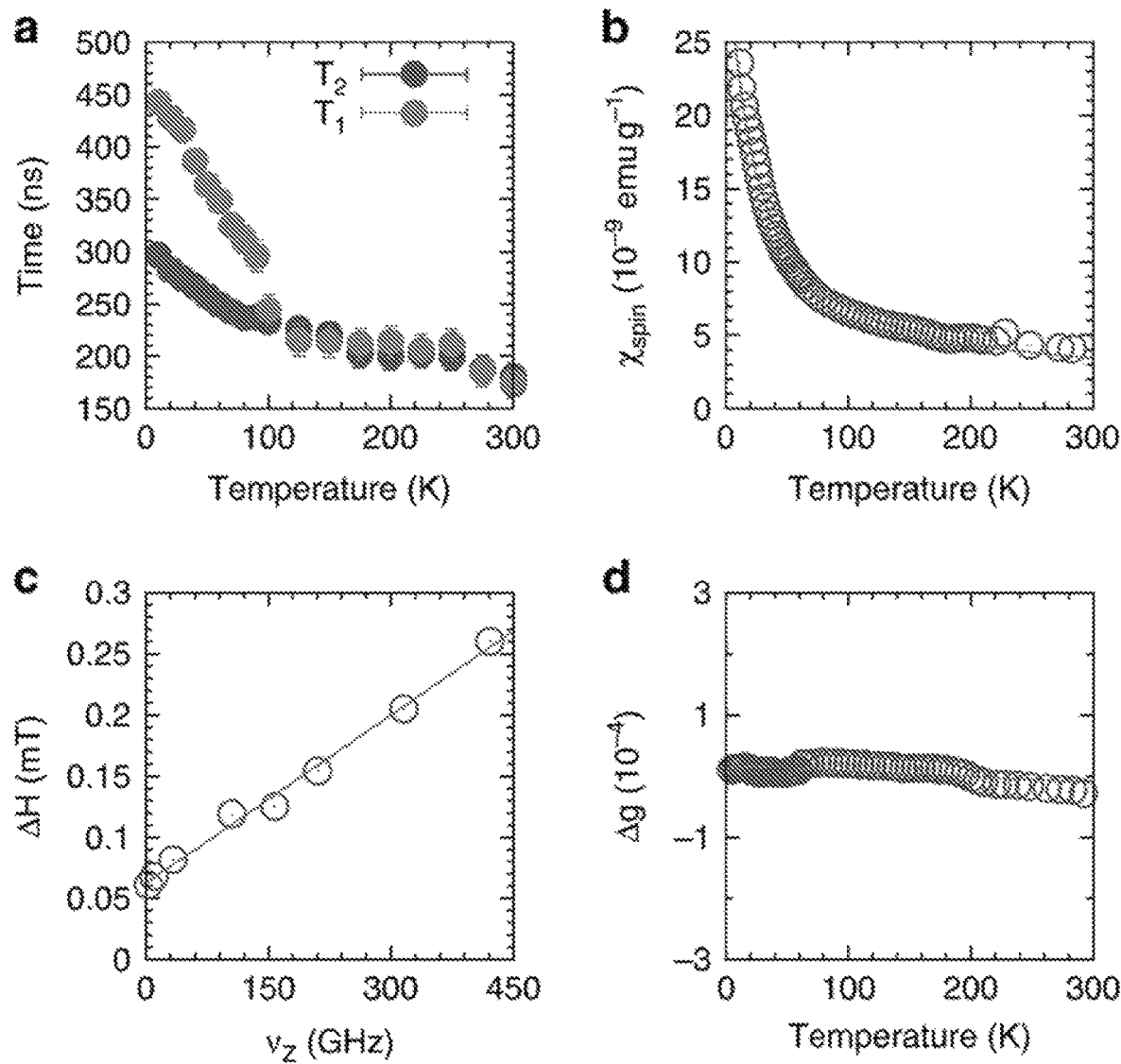
FIG. 20 illustrates (a) Temperature dependence of $T_1$ and $T_2$ at $v_Z$=9.5 GHz. (b) Temperature dependence of the spin susceptibility, $\chi_{spin}$, measured by ESR at $v_Z$=9.4 GHz with an overlaying Curie-Weiss line, characteristic to small paramagnetic particles. (c) The ESR linewidth is plotted as a function of the Zeeman energy, $E_Z$=$hv_Z$ measured by a multi-frequency ESR at 300 K. The linear fit (straight solid line) using equation (1), with $T_1=T_2$=175 ns gives $\delta$=1 meV. (d) The temperature-independent g-factor shift $\Delta$g relative to the free electron g-value, in good agreement with a material exhibiting very weak spin-orbit coupling. Error bars represent the confidence interval of least square fits to the spectra.

Multi-frequency ESR in the 4-420 GHz frequency and 2-300 K temperature range also confirmed that conduction electrons are confined within the carbon nanoparticles (FIG. 20). The ESR linewidth revealed a linear increase with increasing magnetic field at 300 K (FIG. 20c). Note that in the case of bulk metals, $\Delta H$ is solely determined by spin-orbit coupling thus it is independent of the magnetic field. However, the behaviour observed when the carbon nanospheres experience a variation in external magnetic field is characteristic to conduction electrons enclosed in nanoparticles where $T_1$ and $T_2$ are determined by both the spin-orbit interaction and electron confinement. This broadening of $\Delta H$ for itinerant electrons confined on small particles follows:

$$\Delta H = E_Z/(\delta \gamma_e T_2) \qquad (1)$$

where $E_Z$ $h\nu_Z$ is the Zeeman energy, $\delta$ is the average electronic energy level spacing and $\gamma_e$ is the electron gyromagnetic ratio. It is noted that $\tau_S$ in the previous examples is replaced by $T_2$ in the following examples. Using the measured $T_1=T_2=175$ ns, we can extract a $\delta=1$ meV for the average electronic energy level spacing (linear line of best fit in FIG. 20c). From this value one can calculate back the size of the carbon spheres by following Kubo's calculations for a small, almost spherical, metallic particle:

$$\delta = 4 m_e v_F^2 / 3 n \pi L^3 \qquad (2)$$

where $m_e$ is the free electron mass, $v_F=10^6$ ms$^{-1}$ is a typical Fermi velocity for graphene, and n=2.3 g cm$^{-3}$ is the atomic density of the carbon nanospheres. These values yield an effective linear particle size of L=40 nm. This particle size is in good agreement with that obtained from TEM images. Furthermore, the increase in $T_1$ and $T_2$ as the temperature is decreased (FIG. 20a) is characteristic to metals, where electron-phonon scattering due to spin-orbit interaction is responsible for the temperature-induced shortening of $T_1$ and $T_2$.

As the temperature was decreased, $T_2$ reached 300 ns at 4 K while $T_1$ reached 450 ns (FIG. 20a). There is a deviation from the $T_1=T_2$ dependence below ~100 K. During the delineation of $T_1$ and $T_2$ below ~100 K, $T_1$ and $T_2$ nevertheless continue to increase at different rates. The electron spin dynamics of $T_1$ is directly related to phonon dampening in disordered graphitic sheets and the existence of Wallis-type local phonon modes. Future studies have to show if further localization at specific defect sites occurs at very low temperatures. As the temperature is increased, the calculations of Andersson et al. indicate that the observed shortening of $T_1$ and $T_2$ is caused by the scattering of conduction electrons by the potentials of peripheral atoms having edge-inherited electronic and lattice dynamical features and the excitation of low-energy phonons.

From structural, chemical and electronic characterization the non-bonding orbitals associated to the structural imperfections may induce conduction electrons to the system and significantly enhance the electron density of states. This is indicates the presence of an additional band superimposed upon the bonding $\pi$ and the anti-bonding $\pi^*$ bands around the Fermi energy in nanometre size disordered graphitic fragments, and is in agreement with observations of the changes in the $p_z$ wave functions in the p-$\pi$ band evolutions with temperature near the Fermi energy level.

The carbon nanospheres also contain covalently bonded oxygen that contributes to the disorder within the graphitic lattices (FIG. 5f-h). The removal of oxygen groups by thermal decomposition introduces non-bonding $\pi$ and $\sigma$ orbitals. In future experiments, greater robustness against spin decoherence may be achieved by the removal of adatoms to enhance the electronic density of states.

Although the carbon nanospheres are highly defective, the intrinsically weak spin-orbit interaction of carbon has allowed for long $T_1$ and $T_2$ to persist even at 300 K. In nanotubes and fullerenes, an increase in spin-orbit coupling due to graphene sheet curvature may contribute to the shortening of $T_1$ and $T_2$, however the individual graphitic flakes in the carbon nanospheres are not curved. The $T_1=T_2$ in the carbon nanospheres is remarkably a two orders of magnitude enhancement over that found in conducting crystalline graphene. Part of this increase in $T_1$ and $T_2$ may be attributed to quantum confinement effects in conducting nanostructures.

Figure 21:
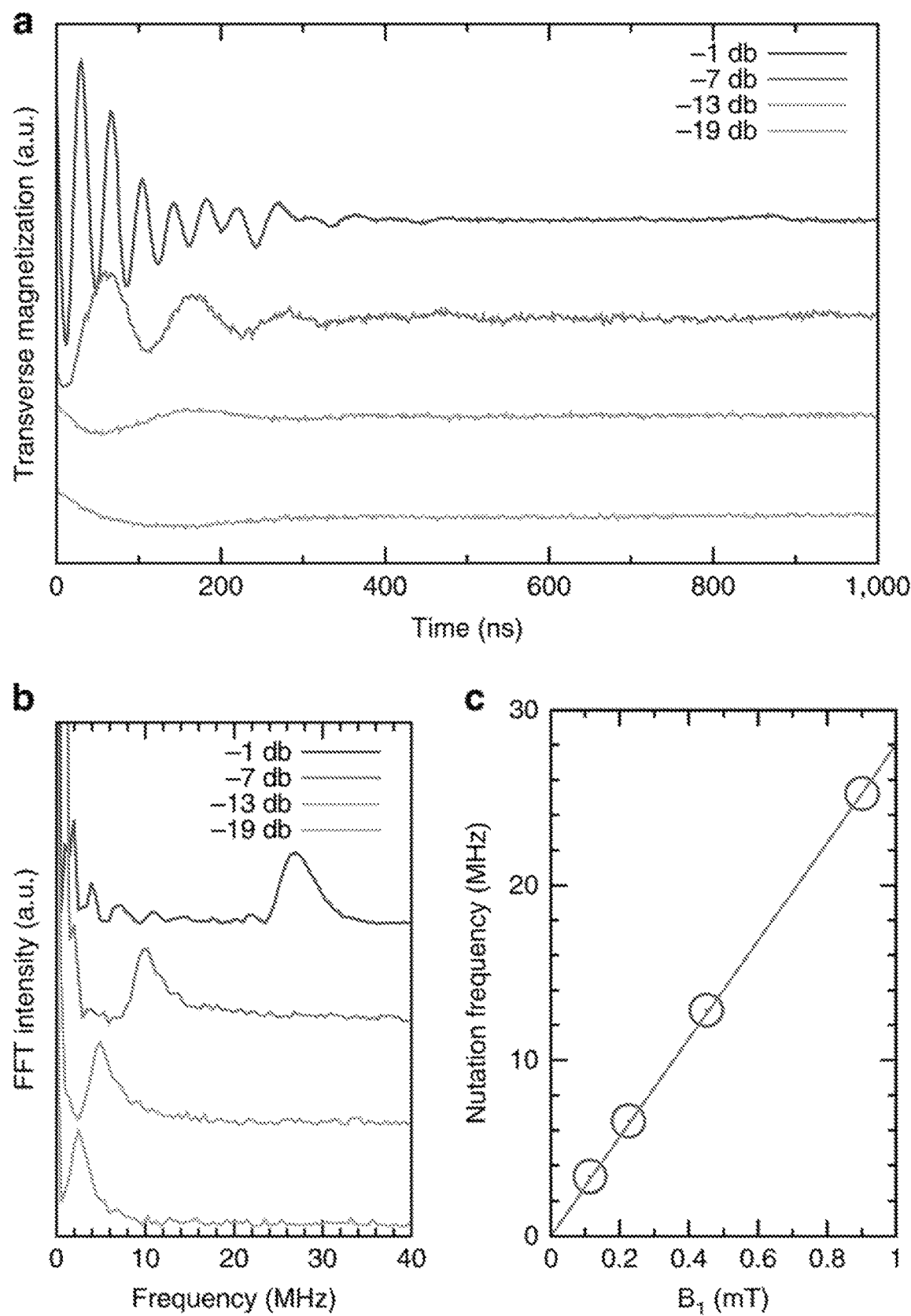
FIG. 21 illustrates (a) Rabi oscillations of the electron qubits at 300 K and $B_0$=337 mT for different microwave powers. (b) Fourier transform of the Rabi oscillations, with the signal shifted vertically for clarity. (c) Rabi frequency is proportional with the square root of the power. The value 25 MHz observed for the maximum power is consistent with the previously determined maximum $B_1$ field in the dielectric cavity of 0.9 mT, indicating the presence of an effective spin S=½.

Following observations of magnetically induced spin polarization, the electron spin at 300 K may be rotated by applying microwave power bursts of increasing duration and with variable power (FIG. 21a). The magnetization of the carbon nanospheres oscillates periodically with pulse duration, the oscillation frequency being proportional to the square root of the microwave power. This oscillation indicates deliberate and coherent electron spin rotations (driving of electron spins between two Zeeman-split energy levels), or Rabi oscillations. This is the sign that one can manipulate spins both for spintronics and quantum information processing. Fourier-transformed Rabi oscillation signals show a single-component characteristic to electron spin-½ qubit (FIG. 21b).

A key characteristic of the Rabi process is a linear dependence of the Rabi frequency on the microwave field strength $B_1$ ($f_{Rabi}=g\mu_B B_1/h$). This can be verified by extracting the Rabi frequency from a fit of the Fourier-transformed signal of FIG. 21b with a Gaussian line, which gives the expected linear behaviour that is proportional to B1 (FIG. 21c). This demonstrated the capacity to rotate the spin qubits on the carbon nanospheres arbitrarily to any point on the Bloch sphere at temperatures as high as 300 K. Rabi oscillations can be observed for ~400 ns, consistent with decoherence by $T_2$. The increase in linewidth of the Fourier-transformed oscillations with microwave power (FIG. 21b) is caused by microwave field inhomogeneity.

The above disclosure demonstrates that a long itinerant electron spin lifetime in a magnetically homogenous conducting material can be achieved at room temperature. Through the controlled polarization of coherent electron spins in these carbon nanospheres, this electron spin lifetime exceeds the prerequisite for applications in spintronics and quantum information processing. This is possible through electron confinement to nanometre-sized, non-crystalline yet metallic-like carbon spheres. This effectively bridges the disparate research directions in the fields of inorganic and molecular materials for electron spin qubits and has broad applicability: spin qubits can now be manipulated at room temperature without the need for isotopically engineering a host material, diluting the spin-carrying molecule, cryogenic temperatures, the preparation of well-defined crystal structures, or the use of metals. The facile preparation of a carbon material using common laboratory reagents, combined with the use of well-established electron spin manipulation measurements at room temperature, effectively reduces many of the technological barriers to realising practical quantum computing and spintronics using solid-state materials.

The spin-manipulation experiments described here may be performed on a large number of carbon nanospheres. Although the material can be readily chemically processed, it is prepared in a form suitable for device processing: the conducting nanospheres can be isolated on a silicon surface by physically manipulating individual nanospheres. In principal, this may provide an initial avenue to high-density qubit arrays of nanospheres that are integrated onto existing silicon technologies or thin-film-based electronics.

Sample Preparation

The preparation of the carbon nanospheres can be described as the soot product resulting from the partial combustion of naphthalene in air, which is collected and heated at 473 K under dynamic vacuum for 72 h. Approximately 100 mg was prepared for further experimental procedures.

Transmission Electron Microscopy

Samples were analysed using a field emission JEOL3000F operated at 300 kV. Particle-size distribution and topography image analysis was performed using freely available ImageJ 1.48v software (http://imagej.nih.gov/ij). Energy-filtered tomography images were obtained using a JEOL JEM 2200FS Field Emission Microscope operated at 200 kV using a high-tilt holder, with an in-column omega filter and objective aperture applied. JEOL recorder software v2.48.1.1 was used to collect the topography images. JEOL Composer and JEOL Visualizer-kai programs were used to reconstruct the tomography images.

Scanning Electron Microscopy

Scanning electron microscopy was performed using a Zeiss Ultra Plus.

X-Ray Photoelectron Spectroscopy

Measurements were conducted using an ESCALAB250Xi instrument manufactured by Thermo Scientific, UK. The background vacuum was better than $2 \times 10^{-9}$ mbar. A monochromated Al $K_\alpha$ (energy hv=1,486.68 eV) was used with a spot size of 500 µm. The fine carbon powder was manually pressed onto indium foil for analysis or pressed into a disc prior to in situ heating experiments. Curve fitting was performed using the Scienta ESCA300 data-system software. Binding energy reference was C 1s=285.0 eV for adventitious carbon.

Raman Spectroscopy

Raman spectroscopy was performed using Argon 514 nm excitation laser on a Renishaw Raman inVia Reflex with a notch and edge filter cutoff of 100 cm$^{-1}$.

Modulated Thermogravimetric Analysis

Modulated thermogravimetric analysis measurements were obtained using a TA HiRes Discovery TGA in modulated TGA mode with a heating profile of 2° C. min$^{-1}$ under the flow of 20 ml min$^{-1}$ high-purity $N_2$ with sinusoidal temperature amplitude of 4° C. and period of 200 s. A 100-µl alumina pan was used. Evolved gas analysis (TGA GC-MS) was performed using a Perkin Elmer Thermogravimetric Analyzer Pyris 1 coupled to a Perkin Elmer Gas Chromatograph Clarus 680 and Mass Spectrometer Clarus SQ 8 C.

Continuous-Wave ESR

Experiments were performed on a home built quasi-optical spectrometer operated in the 55-420 GHz frequency range in a corresponding 0-16 T field range. At low frequencies of 4, 9.4 and 34 GHz, a Bruker elexsys E500 spectrometer was used. For a typical experiment, about 1 mg of the carbon sample was weighed and then sealed in a quartz ESR tube after being heated at 500 K under dynamic vacuum overnight. For temperature- and frequency-dependent experiments, the magnetic field modulation amplitude was smaller than 0.01 mT and the microwave power was set to 0.2 µW to avoid signal distortion. For g-factor reference, a polycrystalline $KC_{60}$ powder was used with g=2.0006.

Pulsed ESR

Experiments were performed at 9.4 and 34 GHz using Bruker ElexSys 580 and 680 spectrometers. For $T_2$ determination we used a simple 2-pulse sequence, invoking a first π/2 pulse of 16 ns, and an initial delay of the second pulse of 300 ns. The resulting echo was integrated over 175 ns. For $T_1$, a 3-pulse sequence was used. An initial π pulse of 32 ns was followed after 300 ns delay by a 2-pulse echo sequence with 200 ns initial pulse delay for monitoring the inversion recovery. For Rabi experiments, a single π/2 pulse was used. Its length was incremented by 2 or 4 ns. After a delay of ~84 ns with respect to the pulse ending, the signal was observed with a short integrating time of 16 ns.

The Table below shows sp$^2$ to sp$^3$ carbon content in the sample obtained from the XPS C 1s core line.

| Temperature/K | sp$^2$/% | sp$^3$/% |
|---|---|---|
| 298 | 66 | 34 |
| 363 | 62 | 38 |
| 493 | 60 | 40 |
| 583 | 60 | 40 |

X-Ray Photoelectron Spectroscopy

The main core C 1s envelope was representative of an asymmetric peak commonly obtained for conducting graphitic materials; having a low level of oxidation and a very narrow peak width at half-maximum (FHWM less than 1.2 eV) and positioned at a binding energy corresponding to pure graphitic material 284.5 eV (FIG. 11a). Upon heating, the C 1s peak did not shift from the sp$^2$ graphite binding energy position of 284.5 eV or change notably in width at half maximum.

Figure 15:
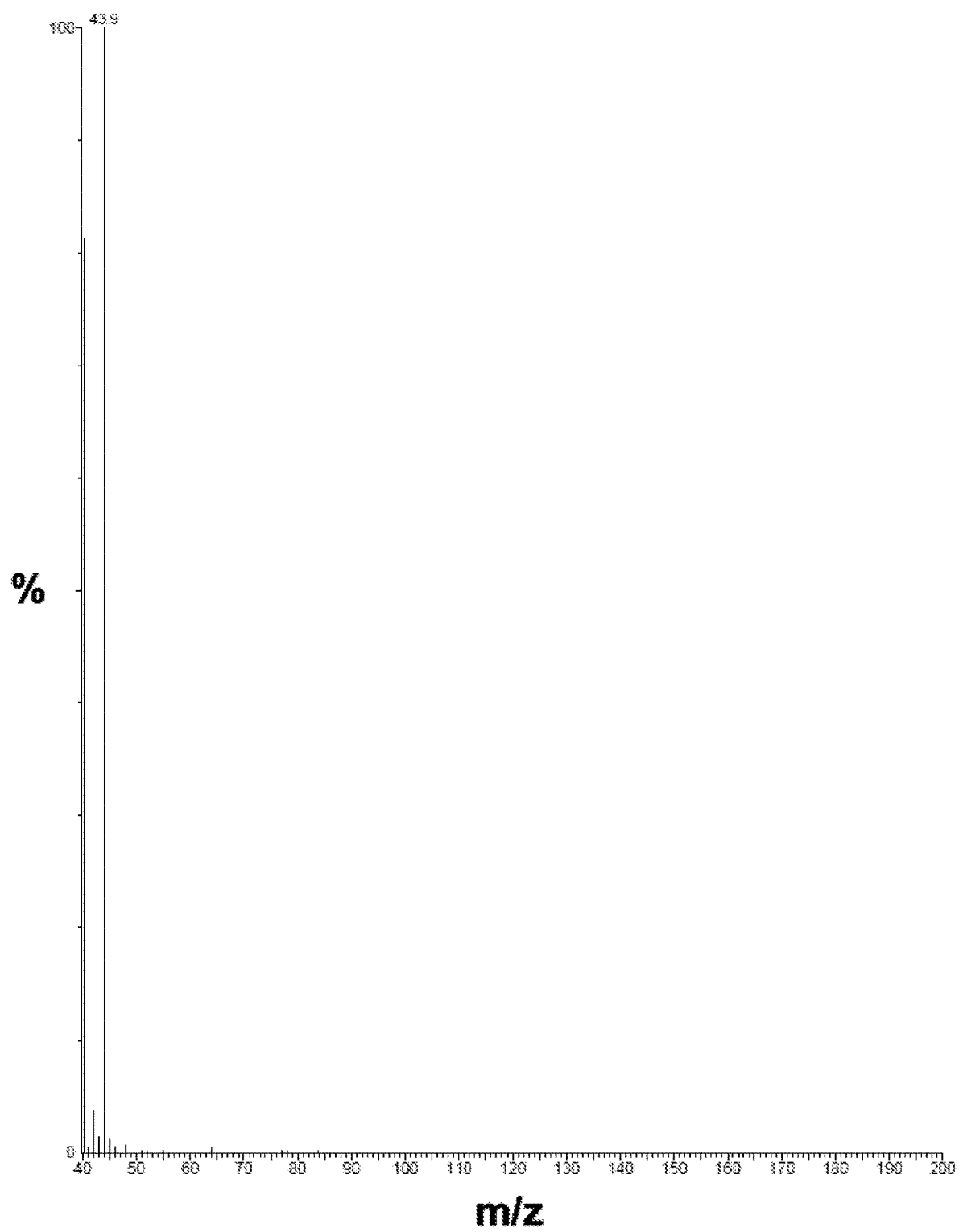
FIG. 15 illustrates TGA-mass spectra. Heating of CNSs from 150° C. to 610° C., showing a m/z corresponding to $CO_2$. No evidence of naphthalene or other polyaromatic hydrocarbons in the sample.

The total atomic ratio at 298 K of carbon to oxygen was ca. 12:1 which increased to ca. 14:1 as the material was heated, FIG. 11. The increase in temperature resulted in the removal of oxygen in the form of $CO_2$ (FIG. 15). Curve fitting employed for the O 1s line indicated both O=C (533.2 eV) and O—C (531.8 eV) chemical bonding environments were present in the onion-like carbon nanospheres. It was inappropriate to quantify the individual oxygen environments present as there was low total oxygen content (less than 10 at. %), a small difference in oxygen lost during heating (less than 0.8 at. %), and a broad O 1s line peak (FHWM ca. 3.8 eV), FIG. 15b. The XPS results indicated that the CNSs remained chemically and thermally stable even up to temperatures of 583 K.

The valence band XPS spectrum (FIG. 12) shows a fairly broad, intense peak located between 16 and 23 eV, a narrower less intense peak with a well-defined minimum located between 12 to 15 eV (both assigned to C 2s), and a very broad and decidedly weaker structure tailing off and extending from 12 eV to the cut-off energy (p-σ peak) typical of graphitic material. The C 2s peak had two peaks (10-25 eV) which strongly suggested the presence of an sp$^2$ network made up of six-fold rings, as this feature is known to 'wash-out' by the presence of an increased number odd-membered rings in a random network. A single O 2s contribution is also observed between 24 to 29 eV.

The positions of the band peaks do not change with temperature. The p-π states are not apparent in the as prepared CNSs and only appear as a shoulder on the leading edge of p-σ peak after annealing beyond 363 K and persists even when cooling to 123 K. The emergence of the p-π band may arise from changes in the $p_z$ wave functions at large radii due to the delocalised nature of the p-π orbitals. The evolution of p-π states with temperature closely resembled that observed for amorphous/non-crystalline carbon (above 623 K in amorphous carbon), and the presence of an O 2s contribution was similar to that observed in partially oxidised graphitic fibres.

Thermo-Gravimetric Analysis

Figure 13:
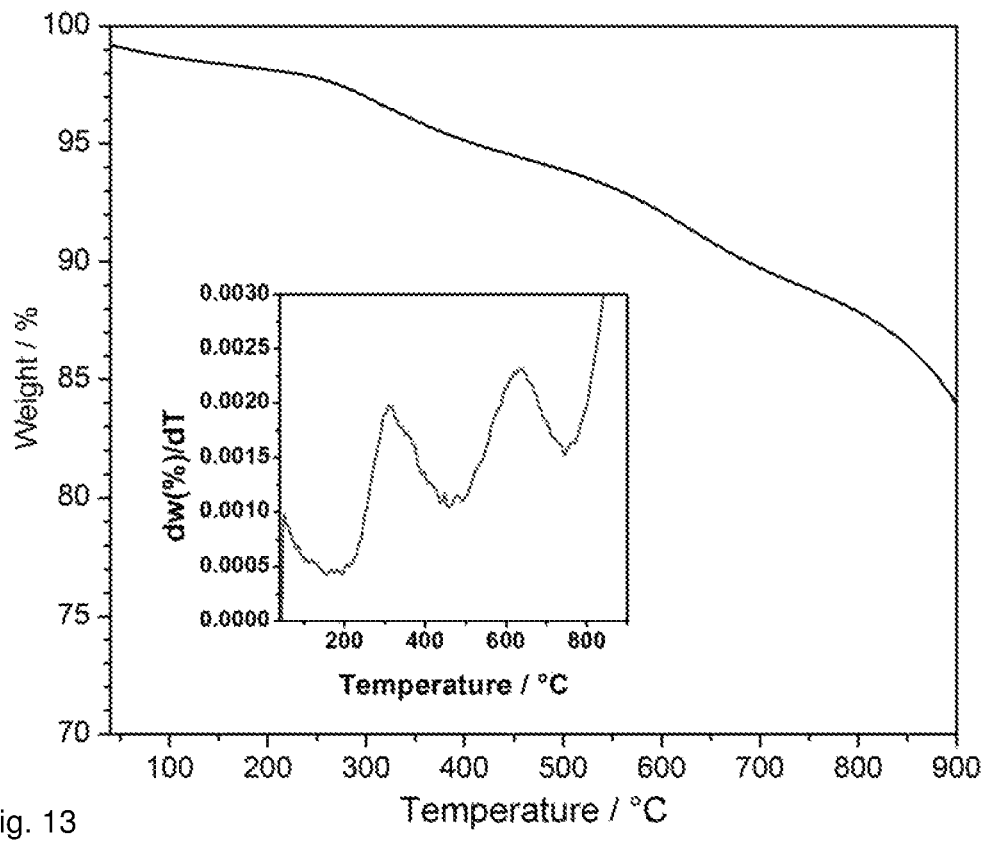
FIG. 13 illustrates high resolution TGA of the CNSs material. Inset shows the derivative of weight loss as a function of temperature with 2 prominent weight loss features at ca. 310° C. and 610° C. Less than 2% of weight loss event occurred which can be attributed to degas and solvent losses (temperature up to 150° C.).
Figure 14:
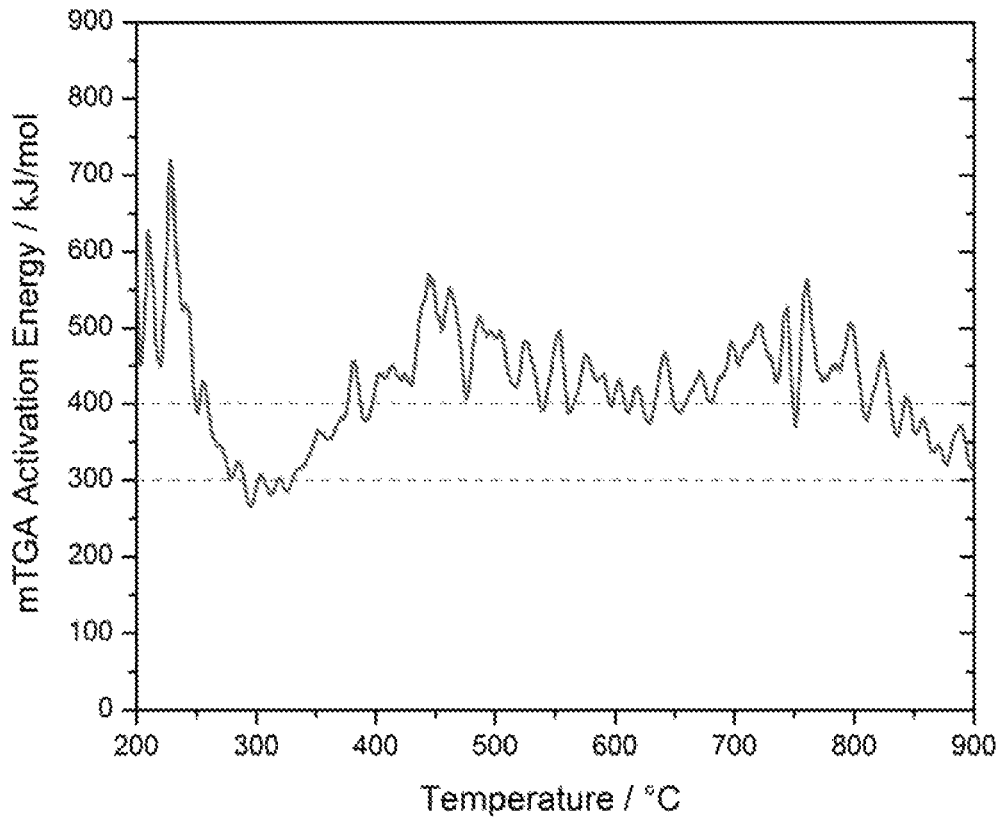
FIG. 14 illustrates activation energy during heating to 900° C. obtained from the modulated TGA experiment on the CNSs. The corresponding major weight loss events at ca. 310° C. and 610° C. have activation energies of ca. 300 kJ/mol and 400 kJ/mol respectively, indicating very slow kinetics of decomposition.

In FIG. 13 two weight loss events occurred very distinctly, at 583 K and 883 K, attributed to the removal of chemically bound oxygen in the form of $CO_2$, (see FIGS. 11 and 14). Less than 2 weight percent (wt. %) was lost at 493 K (attributed to degassing, removal of adsorbed $H_2O$), less than 5 wt. % at 583 K, and remarkably only less than 10 wt. % at 923 K. The large activation energies associated with the main weight loss events (300-400 kJ/mol) were evidence of very slow decomposition of the carbon, FIG. 13. The removal of oxygen from O—C and O═C groups may occur separately.

Raman Spectroscopy

Figure 16:
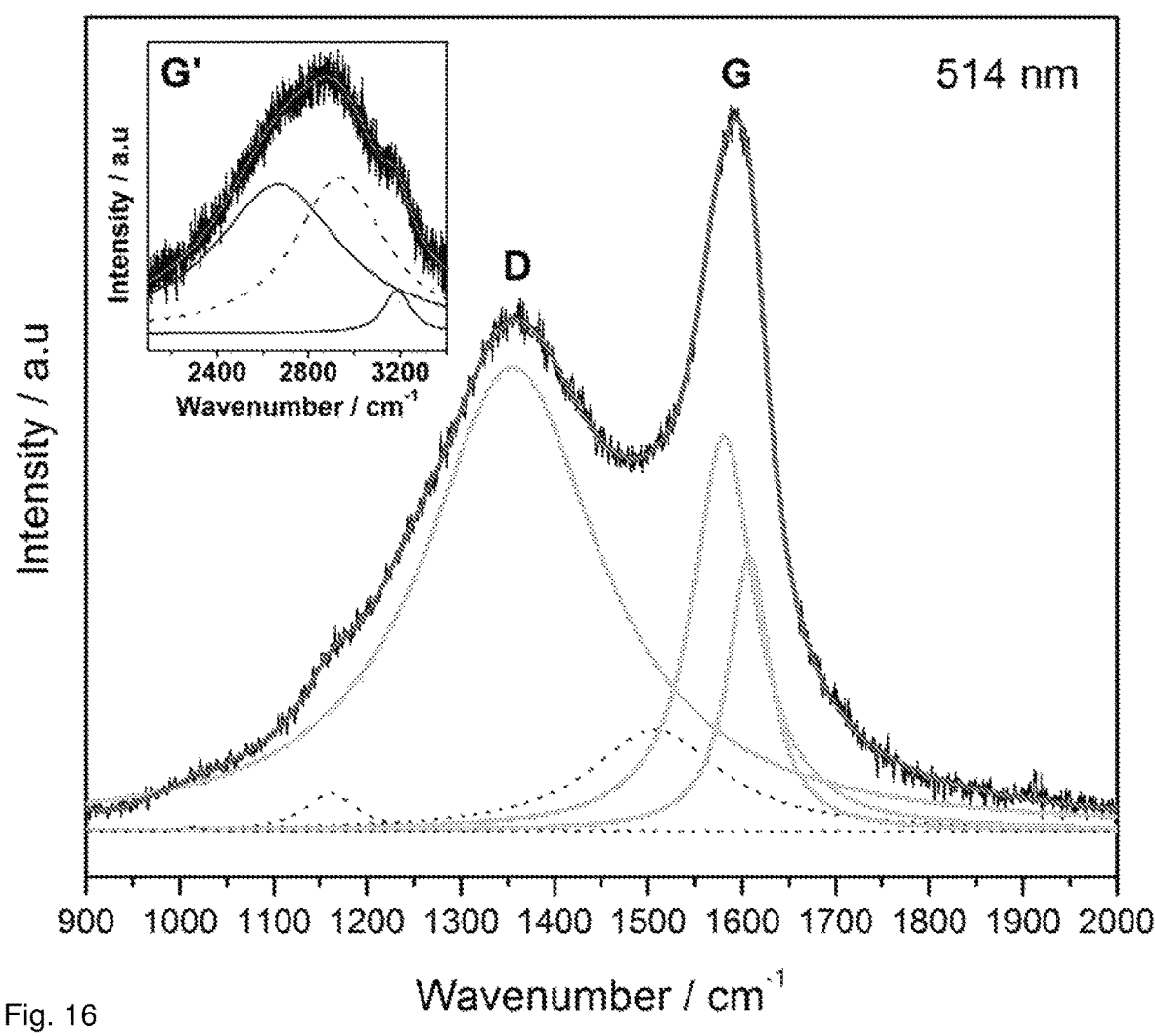
FIG. 16 illustrates Raman spectra of CNSs sample. Lorentzian line-shape peak fitting shown, with dashed lines representing band contributions from ethanol. Red outline is the envelope of the peak fitting. Second order peaks, G', shown in the inset.

The Raman spectra of the carbon material best represents a disordered carbon material between nano-crystalline graphite to low $sp^2$ non-crystalline carbon, FIG. 16, which agreed well with XPS analysis on the ratio of $sp^2$ to $sp^3$ carbon (see table above). Lorentzian curve fitting employed on the Raman spectrum of the graphene material showed an asymmetry in the 'G band' yielding peaks centered at 1580 $cm^{-1}$ with FWHM 80 $cm^{-1}$ and 1607 $cm^{-1}$ with FHWM 54 $cm^{-1}$ with decreasing relative intensity. This G 'band' my be due to the in-plane stretching motion between pairs of $sp^2$ carbon atoms. This mode does not require the presence of six-fold rings, so it occurs at all $sp^2$ sites not only those in rings, and appears in the range 1500-1630 $cm^{-1}$. The asymmetry in the peak may be caused by doping of the graphitic layers by ethanol present which was used to disperse the sample prior to measurement.

The presence of the 'D band' centered at 1355 $cm^{-1}$ with FWHM 230 $cm^{-1}$, may be related to the number of ordered aromatic rings, and affected by the probability of finding a six-fold ring in a cluster. The second order peaks (G') are not well defined, but appear as a small modulated bump between 2200 and 3500 $cm^{-1}$ and best represent a multi-layer graphitic material in the presence of some ethanol.

The intensity ratio of the D band to the G band(s) value, referred to as $I_D/I_G$, was 1.2 and 1.7, indicating a significant number of defect sites present. This value compares well with reported $I_D/I_G$ values for carbon nanospheres, which range between 0.8-1.2. The relative intensity and positions of the G and D bands have been interpreted to be due to the presence of defects and disorder in the short range graphitic fragments. This is directly verified with TEM (FIG. 5 and FIG. 10). The identification of bands associated with other phases, which may also be present in smaller quantities (e.g. diamond), was not possible due to the background of the Raman spectrum contributions of disordered carbon.

Electron Spin Resonance

ESR experiments revealed a presence of a single narrow ($\Delta H$=0.05 mT) Lorentzian line with g=2.00225 at 9.4 GHz frequency (FIG. 4). The spectral resolution of ESR is proportional to the frequency. The deviations from the Lorentzian shape even at 420 GHz were smaller than 5%. There was no g-factor anisotropy observed within the resolution of the 420 GHz measurements of $\Delta g<10^{-6}$. Note that in carbon the g-factor values of localized paramagnetic centres are in the 2.0025-2.0050 range with anisotropies $\Delta g$ in the order of $\sim 5\times 10^{-4}$.[1]

A spin-½ system in magnetic field $B_0$ is a two-level quantum system which can be a physical representation of a qubit. If an oscillating magnetic field is applied in such that the total magnetic field B acting on the spin is $B=B_0 z+B_1(\sin(\omega t)x+\cos(\omega t)y)$ the qubit will oscillate between the states $|+½\rangle$ and $|-½\rangle$. Let the q-bit be in state $|-½\rangle$ at t=0. The probability to find the q-bit in state $|+½\rangle$ at time t is $$P(t)=(\omega_1/\Omega)^2 \sin^2(\Omega t/2)$$

where $\Omega=\sqrt{(\omega-\omega_{0_1})^2+\omega^2}$ and $\omega_0=\gamma B_0$, $\omega_1=\gamma B_1$, and $\gamma$ is the gyromagnetic ratio.

This is called Rabi oscillation. Thus the detected Rabi oscillations of several cycles can be taken as evidence that the system allows the deliberate preparation of any superposition of a two level spin-½ system. For example, to go from one state $|+½\rangle$ to $|-½\rangle$ the time t during which the oscillating field acts can be adjusted such that $\omega_1 t/2=\pi/2$ (i.e. $t=\pi/\omega_1$); this is called a $\pi$ pulse. If a time intermediate between 0 and $\pi/\omega_1$ is chosen, e.g. in the case for $t=\pi/2\omega_1$, we obtain $\pi/2$ pulse, and this results in a superposition of $\sqrt{2}*(|+½\rangle+|-½\rangle)$ of the two states.

Figure 22:
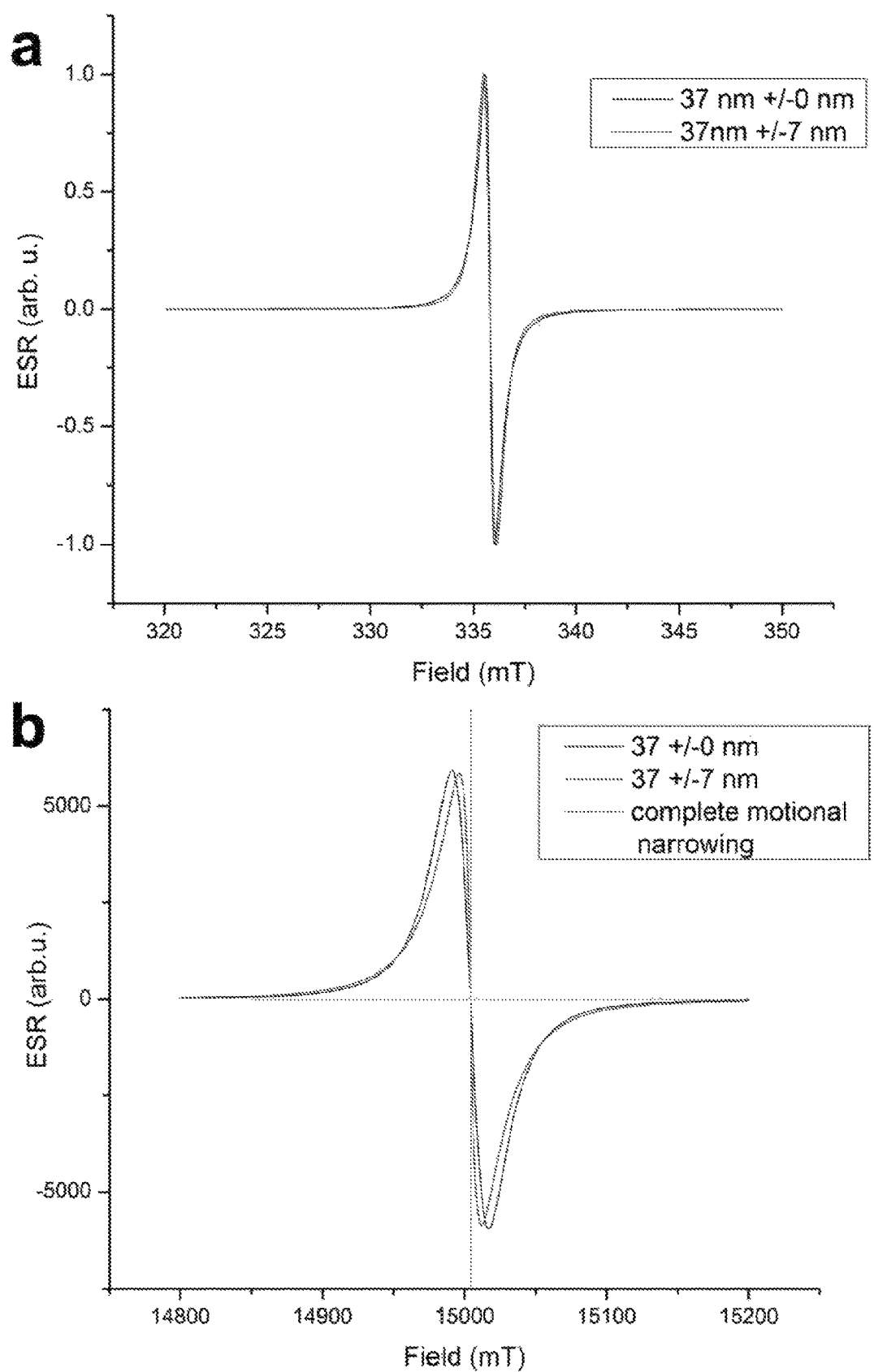
FIG. 22 illustrates (a) Simulated 9.4 GHz ESR spectra of carbon nanospheres based on eq. 1 and 2 with and without the contribution of size distribution. The two spectra are practically identical due to the narrow size distribution. (b) Simulated 420 GHz ESR spectra of CNSs based on eq. 1 and 2 with and without the contribution of size distribution and a simulated spectra assuming (unphysical) complete motional narrowing (indicated by the centered cross).

For conduction electron spin based qubits the size distribution on the ESR relaxation rate has little effect. This is in contrasting difference from localized paramagnetic spin based q-bits like N@$C_{60}$ N-V centers or other molecular magnet based systems. The ESR relaxation at $E_z$=0 is limited by $T_1$ because the motional narrowing of conduction electrons is complete. Thus the ESR line is homogeneous and independent of the size distribution. Inhomogeneous broadening comes about at high magnetic fields. The complete motional narrowing of conduction electrons breaks down as electrons progressively confine to cyclotron orbits. This gives the linear broadening by field described by Equation 1 of the manuscript. The finite size distribution of the particles induces additional inhomogeneity because the slope of the field dependent broadening depends on the particle size (Equation 2 above). At the typical ESR frequency at X-band (FIG. 22*a*) the size distribution induced broadening is negligible. At high frequencies the broadening induced by size distribution is enhanced, however, it is still negligible compared to the magnetic field induced broadening as shown in FIG. 22*b*.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A quantum electronic device comprising:
    a carbon nanosphere adapted to store a qubit represented by an electron spin; and
    a control and readout device to set the qubit and read the qubit stored on the carbon nanosphere, wherein the carbon nanosphere is not hollow and the carbon nanosphere comprises:
        metallic electron spin states delocalised over the volume of the carbon nanosphere, the electron spin states being itinerant in nature with electron spin lifetimes at room-temperature of at least 115 nanoseconds, and
        short graphitic fragments that form unclosed shells following the curvature of a sphere.

2. The quantum electronic device of claim 1, wherein the carbon nanosphere has a diameter of between 10 nm and 150 nm.

3. The quantum electronic device of claim 1, wherein the carbon nanospheres has a diameter of 35 nm.

4. The quantum electronic device of claim 1, wherein the carbon nanosphere is at a temperature between −40 degrees Celsius and +40 degrees Celsius.

5. A method for quantum computing, the method comprising:
    storing a qubit represented by an electron spin on the carbon nanosphere of the quantum electronic device according to claim 1;
    performing a quantum operation on the qubit to generate a resulting qubit; and
    reading the resulting qubit from the nanosphere.

6. The quantum electronic device of claim 1, wherein the quantum electronic device is a spintronic device comprising:

multiple carbon nanospheres each of which being adapted to provide a qubit represented by an electron spin in that carbon nanosphere; and a control device to facilitate interaction between the qubits on the multiple carbon nanospheres to perform a quantum operation.

7. The quantum electronic device of claim 6, further comprising:

a conductor coupled to the carbon nanospheres to provide transport of electrons that carry the electron spin.

8. The quantum electronic device of claim 7, wherein the conductor comprises a graphene structure.

9. The quantum electronic device of claim 7, further comprising an electrode associated with each of the multiple carbon nanospheres.

10. The quantum electronic device of claim 9, further comprising an isolation layer to isolate the electrodes from the multiple carbon nanospheres.

11. The quantum electronic device of claim 10, wherein the isolation layer has a thickness between 200 nm to 400 nm.

12. The quantum electronic device of claim 10, wherein the isolation layer comprises an $SiO_2$ layer.

13. The quantum electronic device of claim 6, wherein a distance between the multiple carbon nanospheres is such that the spin is not lost during transport between the multiple carbon nanospheres.

14. The quantum electronic device of claim 13, wherein the distance between the multiple carbon nanospheres is between 50 nm and 1,000 nm.

15. Use of a carbon nanosphere for the fabrication of the quantum electronic device of claim 1.

16. The quantum electronic device of claim 2, wherein the carbon nanosphere has a diameter of between 20 nm and 55 nm.

\* \* \* \* \*